(12) United States Patent
Oh et al.

(10) Patent No.: US 10,627,789 B2
(45) Date of Patent: Apr. 21, 2020

(54) USER DEVICE, DRIVING METHOD OF USER DEVICE, APPARATUS FOR PROVIDING SERVICE AND DRIVING METHOD OF APPARATUS FOR PROVIDING SERVICE

(71) Applicant: Samsung Electronics Co., Ltd., Suwon-si, Gyeonggi-do (KR)

(72) Inventors: Joon-seop Oh, Paju-si (KR); Young-jin Kim, Yongin-si (KR); Hyun-jae Shin, Seoul (KR); Young-min Won, Suwon-si (KR); Sang-ung Yi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 436 days.

(21) Appl. No.: 14/884,149

(22) Filed: Oct. 15, 2015

(65) Prior Publication Data

US 2016/0124404 A1    May 5, 2016

(30) Foreign Application Priority Data

Nov. 5, 2014    (KR) .................. 10-2014-0153082

(51) Int. Cl.
    *G05B 15/02*    (2006.01)
(52) U.S. Cl.
    CPC .................... *G05B 15/02* (2013.01)
(58) Field of Classification Search
    CPC . G05B 15/02; G05B 2219/2642; G05B 19/02
    See application file for complete search history.

(56) References Cited

U.S. PATENT DOCUMENTS

| | | | |
|---|---|---|---|
| 7,844,353 B2 | 11/2010 | Bejean et al. | |
| 7,957,974 B2 | 6/2011 | Cho et al. | |
| 8,156,500 B2 | 4/2012 | Helander | |
| 8,217,756 B2 | 7/2012 | Kumar et al. | |
| 8,897,176 B2 | 11/2014 | Zhang et al. | |
| 2003/0018508 A1 | 1/2003 | Schwanke | |
| 2006/0047789 A1 | 3/2006 | Kumar et al. | |

(Continued)

FOREIGN PATENT DOCUMENTS

| | | |
|---|---|---|
| CN | 1399218 A | 2/2003 |
| CN | 102158907 A | 8/2011 |

(Continued)

OTHER PUBLICATIONS

Chinese Office Action dated Jul. 2, 2019, issued in Chinese Application No. 201510749557.X.

*Primary Examiner* — Tuan C Dao
(74) *Attorney, Agent, or Firm* — Jefferson IP Law, LLP

(57) ABSTRACT

A user device, a method of driving the user device, an apparatus for providing a service, and a method of driving the apparatus for providing the service are provided. The user device includes a storage configured to receive a rule related to performing an operation of the device and to store the rule, and a controller configured to control to perform a former priority operation based on a determination result of the former priority operation included in the stored rule, and to transmit the rule to a periphery device for performing a latter priority operation included in the rule in response to the former priority operation being completed.

18 Claims, 20 Drawing Sheets

(56) References Cited

U.S. PATENT DOCUMENTS

| | | | |
|---|---|---|---|
| 2007/0037605 A1* | 2/2007 | Logan | G08B 13/1427 455/567 |
| 2007/0266421 A1* | 11/2007 | Vaidya | H04L 63/20 726/1 |
| 2008/0120620 A1* | 5/2008 | Lett | G06F 9/485 718/103 |
| 2008/0125101 A1* | 5/2008 | Bakos | H04M 1/72569 455/418 |
| 2008/0256047 A1 | 10/2008 | Dettinger et al. | |
| 2008/0306740 A1* | 12/2008 | Schuck | G06Q 50/22 704/275 |
| 2010/0161149 A1* | 6/2010 | Nguyen | G06F 1/266 700/296 |
| 2011/0176528 A1 | 7/2011 | Lu et al. | |
| 2011/0214060 A1* | 9/2011 | Imes | G05B 15/02 715/735 |
| 2012/0136811 A1 | 5/2012 | Proctor et al. | |
| 2012/0143810 A1 | 6/2012 | Berg-Sonne | |
| 2012/0307687 A1* | 12/2012 | Zhang | H04W 68/005 370/259 |
| 2012/0317185 A1* | 12/2012 | Shah | H04L 67/306 709/203 |
| 2013/0090773 A1* | 4/2013 | Park | H04L 12/12 700/286 |
| 2013/0178990 A1 | 7/2013 | Kayton et al. | |
| 2013/0197976 A1* | 8/2013 | Mahakian | G06Q 10/08 705/7.38 |
| 2014/0095690 A1 | 4/2014 | Saker et al. | |

FOREIGN PATENT DOCUMENTS

| | | |
|---|---|---|
| JP | 2006-197061 A | 7/2006 |
| KR | 10-0434545 B1 | 6/2004 |
| KR | 10-1143141 B1 | 5/2012 |
| KR | 10-1397471 B1 | 5/2014 |
| WO | 2014/051982 A1 | 4/2014 |

* cited by examiner

USER DEVICE, DRIVING METHOD OF USER DEVICE, APPARATUS FOR PROVIDING SERVICE AND DRIVING METHOD OF APPARATUS FOR PROVIDING SERVICE

CROSS-REFERENCE TO RELATED APPLICATION(S)

This application claims the benefit under 35 U.S.C. § 119(a) of a Korean patent application filed on Nov. 5, 2014 in the Korean Intellectual Property Office and assigned Serial number 10-2014-0153082, the entire disclosure of which is hereby incorporated by reference.

TECHNICAL FIELD

The present disclosure relates to a user device, a method of driving the user device, an apparatus for providing a service, and a method of driving the apparatus for providing a service. More particularly, the present disclosure relates to a plurality of user devices in the Internet of things (IoT) field, the user device configured to consecutively receive a rule according to an operating order defined in the rule related to performing an operation of the device, and to execute a rule engine provided individually to perform an individual operation defined in the rule, a method of driving the user device, an apparatus for providing a service, and a method of driving the apparatus for providing a service.

BACKGROUND

The communication paradigm of the related art used to be centered on human beings, but now the era of Internet of things (IoT) is emerging where things participate in communication as the main subjects. Such development of the IoT environment not only enables changes in social infrastructure and industry as a whole, but also in smart services customized to individuals. For such changes and services, an ecosystem has been suggested that is capable of activating IoT services by approaching various objects to a unified IoT interface.

In the past, services were provided to numerous devices connected to one central server. Each device would process a generated fact, that is information on occurrence of an event, and transmit the generated information to the central server, and perform a command of commanding in the central server. Herein, the fact may be information generated by adding information such as time to the event information. The central server is a server grade device having a high computing power, and all the rules to be processed. The central server receives all the facts from the devices, determines the rules to be performed by a rule engine, and performs related services.

Furthermore, in the technology of writing a rule according to the related art, a trigger-oriented rule writing service is provided. Thus, a rule writing service is provided where a user is made to select a device and a trigger of "if~", and then a "make ~do~" that is suitable to the trigger.

Furthermore, in the technology of the related art, an additional hub device is provided to support a low specification device so that the hub device may communicate with a central server instead of the low specification devices.

However, the technology of the related art causes a problem of performance in the entire system due to load generated by the centralized structure. All the rules are processed and managed by one central server that has a rule engine, and thus the more devices are connected, the more load is generated by the central server, causing the problem of performance in the entire system. That is, since all the devices transmit generated facts to the central server, excessive traffic is concentrated in the central server, thereby causing the entire system to operate inefficiently.

Furthermore, when the central server fails its operation, the entire system does not operate. Even if the connected devices are normal, when an operation of the central server fails, the entire system does not operate.

Meanwhile, the technology of the related art is not intuitive in the perspective of the user due to the trigger-oriented rule writing method. Trigger-oriented rule writing demands the user to think the cause and effect relationship first. That is, it forces the user to think the trigger "if~" first rather than a desired action. However, it is more intuitive and natural for the user to think the action "want to~" first. For example, the user tends to determine the action "want to turn on the television (TV)" first than "if I sit on the sofa" when writing a rule. Therefore, the trigger-oriented rule writing method is not intuitive to the user.

Furthermore, too many operations when writing a rule cause inconvenience to the user. In order to write a rule, the user has to go through a total of six operations of: selecting a trigger device, selecting a trigger, selecting a condition for the trigger, selecting an execution device, selecting an action, and selecting an action trigger. Such numerous operations cause inconvenience and difficulty to the user when writing a rule.

Furthermore, there needs to be an additional device for the hub function. In order to make a low specification device operate in an interlocked manner with the server, there needs to be a separate device for the hub functions. This causes additional costs.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a plurality of user devices in the Internet of things (IoT) field, the user device configured to consecutively receive a rule according to an operating order defined in the rule related to performing an operation of the device, and to execute a rule engine provided individually to perform an individual operation defined in the rule, a method for driving the user device, an apparatus for providing a service and a method of driving the apparatus for providing a service.

In accordance with an aspect of the present disclosure, a user device is provided. The user device includes a storage configured to receive and store a rule related to performing an operation of a device, and a controller configured to control to perform a prior order operation based on a determination result of the prior order operation included in the stored rule, and to transmit the rule to a periphery device for performing a next order operation included in the rule in response to the prior order operation being completed.

The storage may receive the rule from a device for providing a service that received input of an action command regarding the rule or from another user device that performed a former operation than the prior order operation and stores the rule.

The storage may further include a program for executing the prior order operation, and the controller executes the stored programs related to the execution of the prior order operation.

The controller, in response to a storage command regarding the rule, may receive the program from a device for providing a service through a communication interface and stores the received program.

The controller may further include additional information used for performing the next order operation when transmitting the rule to the periphery device.

The prior order operation may include an operation for determining whether or not a predetermined trigger is satisfied, the next order operation may include a control operation to execute in response to the trigger being satisfied, and the operation executor may include at least one sensor for sensing whether or not the trigger is satisfied.

In accordance with another aspect of the present disclosure, a method of driving a user device is provided. The method includes receiving a rule related to performing an operation of the device and storing the rule, and controlling to perform a prior order operation based on a determination result of the prior order operation included in the stored rule, and to transmit the rule to a periphery device for performing a next order operation included in the rule in response to the prior order operation being completed.

The storing may involve receiving the rule from a device for providing a service that received input of an action command regarding the rule or from another user device that performed a former operation than the prior order operation and storing the rule.

The storing may include storing a program for executing the prior order operation, and the storing may involve executing the stored programs related to the execution of the prior order operation.

The storing may involve, in response to a storage command regarding the rule, receiving the program from a device for providing a service through a communication interface and storing the received program.

The controlling may involve further providing additional information used for performing the next order operation when transmitting the rule to the periphery device.

The prior order operation may include an operation of determining whether or not a predetermined trigger is satisfied, the next order operation may include a control operation to execute in response to the trigger being satisfied, and the performing the operation may involve sensing whether or not the trigger is satisfied.

In accordance with another aspect of the present disclosure, a device for providing a service is provided. The device includes a program manager configured to provide a web page to a user for writing a rule related to performing an operation of the device, an operation manager configured to, in response to there being no designation of a device for performing an operation included in the written rule, determine the operation and automatically designating one of registration devices of the user, and a device manager configured to transmit the rule to the designated device in order to perform a prior order operation included in the rule.

The operation manager may control the device manager to transmit a program related to an operation to at least one user device for executing the operation defined in the rule.

The operation manager, in response to a command to execute the written rule from a user, may control the device manager to transmit the rule to a user device for performing a prior order operation defined in the rule.

The operation manager may recognize a context of the user and automatically designates the device.

In accordance with another aspect of the present disclosure, a method of driving a device for providing a service is provided. The method includes providing a web page to a user for writing a rule related to performing an operation of the device, in response to there being no designation of a device for performing an operation included in the written rule, determining the operation and automatically designating one of registering devices of a user, and transmitting the rule to the automatically designated device in order to perform a prior order operation included in the rule.

The method may further include, in response to a command to store the written rule, transmitting a program related to the operation to at least one user device for executing an operation defined in the rule.

The method may further include, in response to a command to execute the written rule from the user, transmitting the rule to a user device for performing a prior order operation defined in the rule.

The automatically designating may involve recognizing a context of the user and automatically designating the device.

According to the aforementioned various embodiments of the present disclosure, it is possible to add device efficiency and system lightening through a dispersed rule engine, and provide intuitiveness and convenience to the user as the user is enabled to select an action first when writing a rule, making writing a rule easy, quick, and simple. Not only that, it is possible to mount a pluggable application related to a trigger and action, thereby providing function expansiveness, and making it possible to perform an operation very simply even in a low specification device according to the rule.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
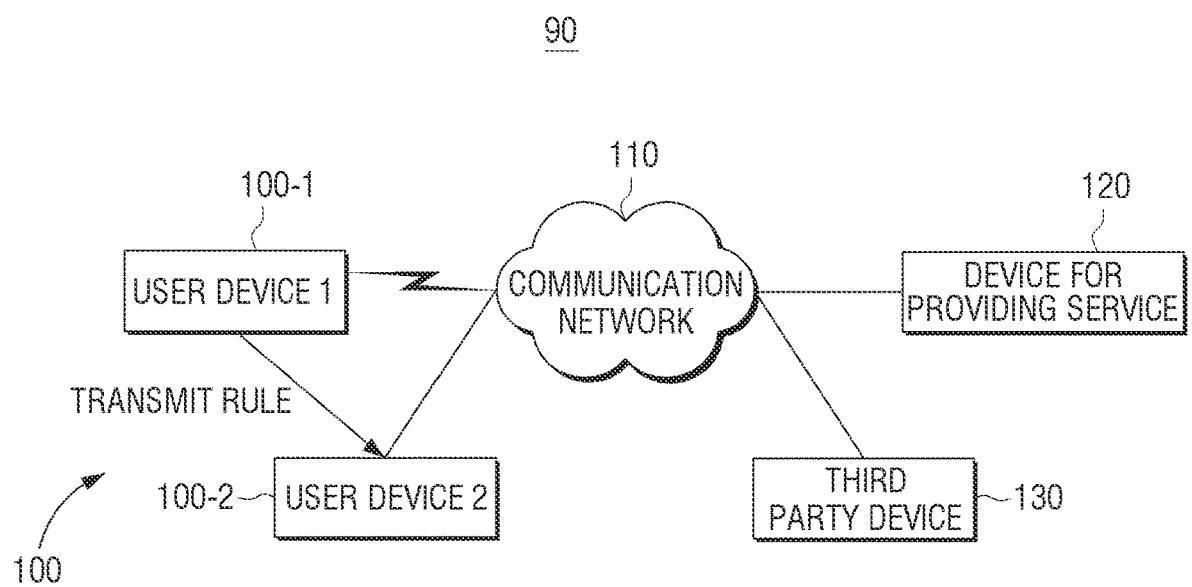
FIG. 1 is a view illustrating an ecosystem according to an embodiment of the present disclosure.
Figure 2:
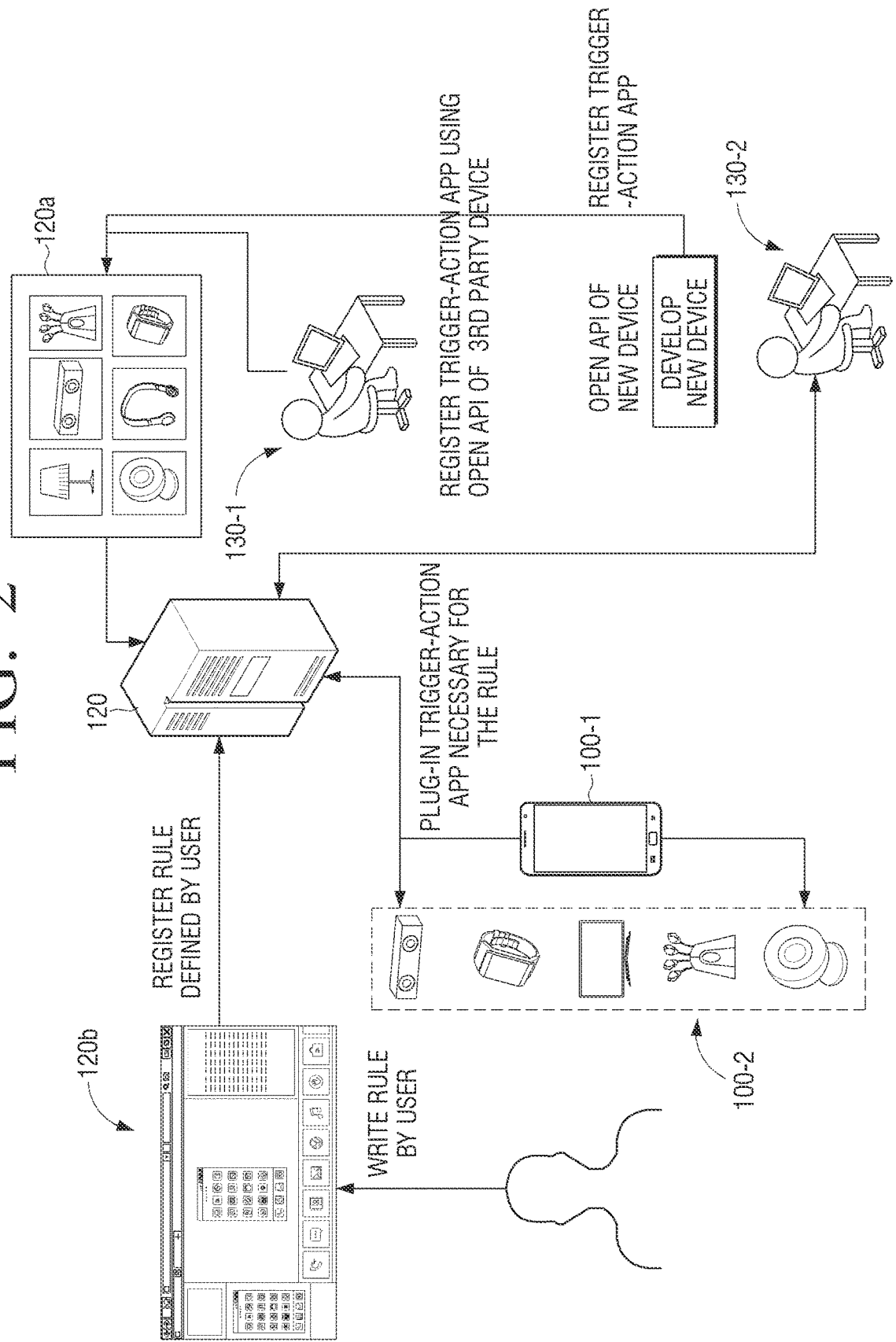
FIG. 2 is a diagram of the ecosystem of FIG. 1.
Figure 3:
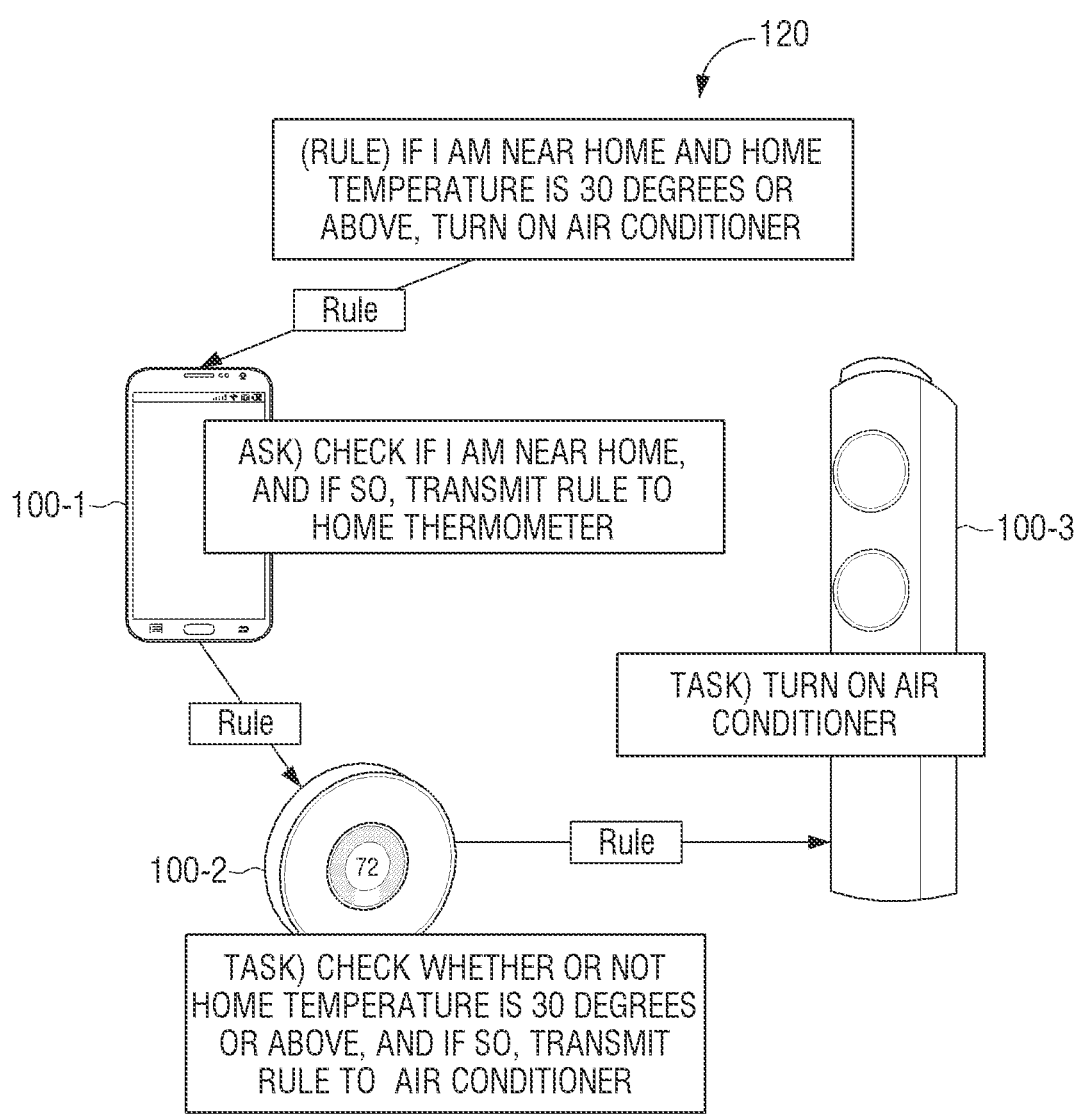
FIG. 3 is a view for explaining a process of performing an operation of a plurality of user devices according to an embodiment of the present disclosure.
Figure 4:
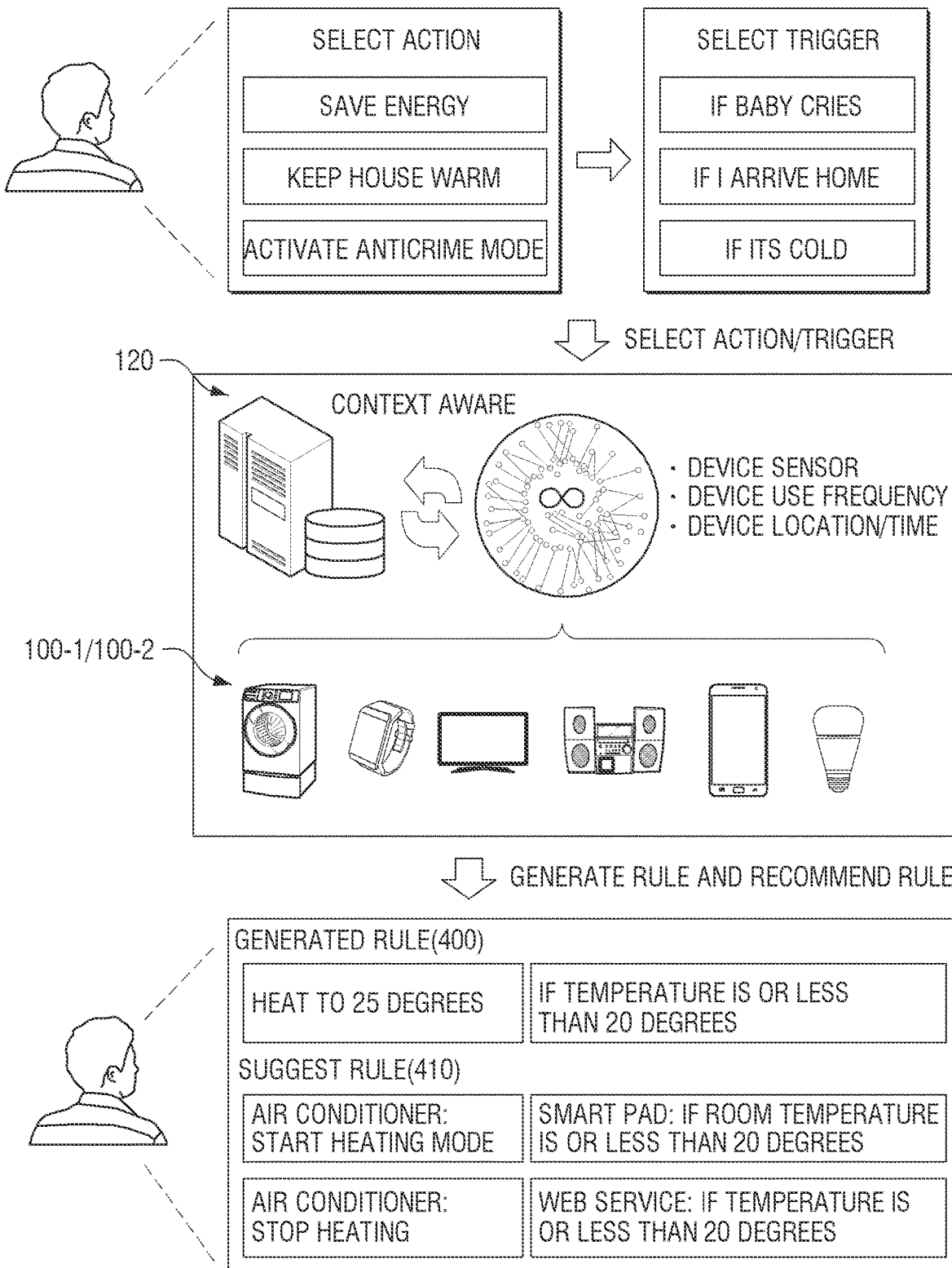
FIG. 4 is a view for explaining a simple process of writing a rule at an abstracted level oriented around a user according to an embodiment of the present disclosure.

FIG. 1 is a view illustrating an ecosystem according to an embodiment of the present disclosure, FIG. 2 is a diagram of the ecosystem of FIG. 1, and FIG. 3 is a view for explaining an operation process of a plurality of user devices according to an embodiment of the present disclosure. Furthermore, FIG. 4 is a view for explaining a simple rule writing process at an abstracted level oriented around a user according to an embodiment of the present disclosure.

Referring to FIG. 1, an ecosystem 90 according to an embodiment of the present disclosure includes at least one user device 100 100-1, 100-2, communication network 110, and a part or entirety of a device for providing a service 120 and a third party device 130. Here, the at least one user device 100 includes user device 1, 100-1 and user device 2, 100-2. In FIG. 2, two third party devices 130 are provided, namely third party device 1, 130-1 and third party device 2, 130-2.

Herein, what it means by including a part or entirety of a device for providing a service 120 and a third party device 130 means that a component such as the third party device 130 may be omitted or another component such as the device for providing a service 120 may be integrated therein, and for easy understanding of the present disclosure, the explanation hereinafter will be made based on a case of including all the components.

The user device 1, 100-1 and user device 2, 100-2 include various electronic devices that a user may use such as a mobile terminal such as a mobile phone, Moving Picture Experts Group phase 1 or phase 2 (MPEG-1 or MPEG-2) audio layer 3 (MP3), plasma display panel (PDP), personal digital assistant (PDA), notebook, and tablet personal computer (PC), thermometer, audio device, television (TV), wearable device, and washing machine and the like. These devices may include a rule engine for the user to execute a rule, that is a rule execution program, and may receive an execution program for performing a certain (operation) task included in the rule, for example an application from the device for providing a service 120. Herein, the application is an application program, a program made with the purpose to resolve a certain task. In other words, unlike basic software such as an operating system or utility program, language processing program and the like, it is a program written with a purpose to process a certain task. An application program may be written directly by the user, but in order to reduce the user inconvenience of writing a program, and to enable easy utilization, application programs developed, written and packaged by experts of various fields are being widely used, and are called package programs.

Furthermore, a rule means a series of operation information that the user designated in order to perform a plurality of operations in association. A rule may consist of a former priority operation (or prior order operation) that must be performed first and a latter priority operation (or next order operation) that must be performed subsequently to the former priority operation. Herein, the former priority operation may include a determining operation of determining whether or not a certain trigger is satisfied, and the latter priority operation may include an action operation that is initiated when the certain trigger is satisfied. There may be various kinds of rules, for example, "release door lock of the house, and recognize user so that when the user comes inside the house, turn on the living room light, and connect the mobile phone to the Wi-Fi network inside the house", "if the user has come home, and sits on the soft, automatically turn on the TV", "if the mobile phone is not in use for a certain period of time and the user lies down on the pillow, execute sleep mode (ex. adjust light, replay sleep mode music etc.), "If I am near the house and the house temperature is 30 degrees or more, turn on the air conditioner" and the like. More specific rule operations will be explained hereinafter.

Furthermore, a rule engine may refer to a program for executing such a rule or hardware for executing the program. For example, a rule engine may refer to a program that plays a core role regarding a small unit of software, that is, a module performing an interface function. The rule engine may be a relatively light-weight rule engine. For example, the user may store in the user device 1, 100-1 a rule writing tool that is a rule writing program that the device for providing a service 120 provides, and execute the stored program and access a web page of the device for providing a service 120 as illustrated in FIG. 2 so as to set a desired rule and then when storing the set rule, the user device 1, 100-1 and user device 2, 100-2 related to the rule may receive an application related to the operation from the device for providing a service 120 and store the same.

Referring to FIG. 2, plugging-in a trigger-action application in a user device refers to a trigger for processing a rule according to a rule written by the user or an application corresponding to the action being installed in the user device. For example, if the rule written by the user is "if the user is home and sits on the sofa, turn on the TV", a program that is an application corresponding to the trigger of sensing whether or not the user has come home, a program corresponding to the trigger of sensing whether or not the user has sit down on the soft, and a program corresponding to the action of turning on the TV are installed in the user device. As such, an embodiment of the present disclosure supports a plug-in of the program corresponding to such a trigger-action thereby enabling the user to dynamically add a rule when using the service.

Then, when the user requests execution of a rule written on a web page, the user device 1, 100-1 for performing a former priority operation may receive a rule that the device for providing a service 120 provides. For example, assuming the user set a rule of "if I am near the house and the house temperature is 30 degrees or more, turn on the air conditioner" as illustrated in FIG. 3, the former priority operation will be determining whether or not I am near the house, and the latter priority operation will be determining whether or not the house temperature is 30 degrees or more, and the last priority operation will be turning on the air conditioner. Therefore, the user device 1, 100-1 for sensing that I am near the house, for example, a mobile phone may receive the corresponding rule first. When the corresponding rule is received, the user device 1, 100-1 determines (or extracts) an operation, that is a task that it must perform. Herein, the task includes an operation related to the trigger or an operation related to the action.

Then, when the operation that it must perform is sensed, and the operation is completed, the corresponding rule is handed over to the user device 2, 100-2, that is, to the thermometer. Herein, in order to perform the corresponding operation, the user device 1, 100-1 may execute an application previously received and stored. When its operation is completed, the user device 1, 100-1 may delete the corresponding rule.

Of course, the deletion may not be made. In other words, the user device 1, 100-1 that received a rule from the device for providing a service 120 is an owner of the corresponding rule. And the user device 2, 100-2 that received the rule from the user device 1, 100-1 is a non-owner of the corresponding rule. That is, the owner of the rule may keep on storing the rule received from the device for providing a service 120 so that the rule may be executed again next time. However, the non-owner that received the rule from the other user device 1, 100-1 may process the rule, transmit the same to a latter priority user device, and delete the rule. In other words, since it cannot start a rule processing for itself, there is no need to maintain it.

Furthermore, the rule owner that received the rule from the device for providing a service 120 and performed a program (or application related to the operation corresponding to the trigger and action) such as a rule engine may not stop (or end) the corresponding program even after processing and transmitting the rule to the latter priority user device 2, 100-2. That is, the rule owner may keep on executing the program so that the rule may be executed once again. However, the rule non-owner executes the program of the received rule, transmits the rule to the latter priority device, and stops the program being executed. That is, when the rule is received from the most former priority user device of the rule, that is the rule owner, then the program is executed, and thus there is no need to keep on executing the program.

By such a method storing a rule, deleting a rule, and ending a program, the user device may efficiently maintain a computing power source (or power). Regarding power saving, since operation is made only when needed, it is possible to support a service with only a low specification hardware (H/W).

Meanwhile, the user device 1, 100-1 may activate and/or inactivate a rule according to a rule activation trigger of a received rule and operate the same. In other words, the user may set a rule activation trigger such as a rule activation time and space and the like when writing a rule, and when such a rule activation trigger is satisfied, the user device 1, 100-1 may process the rule or execute its operation or task included in the rule. For example, even if the user device 1, 100-1 received a rule for a former priority operation from the device for providing a service 120 at a certain point, the user device 1, 100-1 may wait until the rule activation trigger is satisfied and then execute its operation. Information related to such an activation trigger may be a type of additional information, and such additional information may be set through a display screen that newly appears by selecting a separate button icon appearing on the display screen for setting an operation corresponding to the trigger on a web. If there is no setting of activation trigger regarding a certain time or place and the like, it can be deemed that the user device 1, 100-1 is operating all the time.

Furthermore, in the case of processing a plurality of rules, if the plurality of rules include an operation corresponding to one same trigger, in response to the operation corresponding to the one same trigger being sensed, the user device 1, 100-1 may transmit the plurality of rules corresponding to the sensed trigger to each of the different plurality of devices. For example, if the user device 1, 100-1 received A rule, B rule, and C rule from the device for providing a service 120, and each rule includes the same trigger "if the mobile phone wavers", in response to such a trigger being sensed, the corresponding rule may be transmitted to a device for performing a latter priority operation in A rule, a device for performing a latter priority operation in B rule, and a device for performing a second latter operation in C rule. For example, if the latter priority operation in A rule is a global positioning system (GPS) module, the latter priority operation in B rule is a Bluetooth module, and the latter priority operation in C rule is Wi-Fi module, each rule is transmitted to each device having the corresponding module.

Not only that, the user device 1, 100-1 may perform its operation in the received rule and then transmit the rule to the device for performing the latter priority operation based on a predetermined order, but may also determine the next order of transmission, change the order and transmit the rule accordingly. For example, before transmitting a rule to the user device 2, 100-2, the user device 1, 100-1 may determine an operation context of the user device 2, 100-2. In other words, if it is determined through communication with the user device 2, 100-2 that there is excessive internal load in the user device 2, 100-2, the rule may be transmitted to a user device 3 for performing a next latter priority operation. Of course, this should be done when changing the operation order makes no big difference. In this process, when the internal load of the user device 2, 100-2 is relieved, the user device 3 that performed the next latter operation transmits the rule to the user device 2, 100-2, and thus such changing of transmission order may be done without limitation.

Even besides such internal load, the user device 1, 100-1 may check additional information, for example, frequency information, and then change the transmission order without limitation. Herein, frequency information may be information showing how often the users use a certain module. The user device 1, 100-1 may end its operation, and check the frequency information to transmit the rule to a next device, and check whether or not there is a device to perform the operation in advance. If there is no frequency information, the rule will be transmitted to the device for performing the latter priority operation, but if a device is found having frequency information, the rule will be transmitted to that device. For example, the GPS module is not used frequently, and it takes a lot of time to prepare an operation, and thus it is possible to operate the GPS having the frequency information in advance. Such frequency information may be automatically inserted in a device for providing a service 120 when setting an operation of a device that needs to execute the operation first when writing a rule on the web page. When the system designer of the device for providing a service 120 has set that frequency information needs to be inserted in the case of the GPS module, when the operation of the corresponding device is set, the information may be automatically inserted.

Furthermore, after performing its operation, and before transmitting the rule to the user device 2, 100-2 for performing a latter priority operation, the user device 1, 100-1 may update the rule and transmit the updated rule. In other words, the user device 2, 100-2 may insert information showing that its operation has been completed and transmit the same. Not only that, when for example a rule "when a text message arrives, show it on screen" is received, a communication module may determine whether or not a text message has arrived, and if it is determined that a text message has arrived, the user device 2, 100-2 may insert the contents of the text message and transmit it to a device for performing a latter priority operation, that is a display device. Of course in this case, it is possible to insert the information in various formats and transmit the same. For example, the user device 1, 100-1 may insert information in an information area relating to its operation in the corresponding rule, but the user device 1, 100-1 may also insert the information in an information area of a device for performing a latter priority operation and transmit the same.

Meanwhile, assuming the user handles rules related to writing through the user device 1, 100-1, the user may execute a writing tool stored in the user device 1, 100-1 and access the web page to write a rule, but may also download rules pre-written in a rule market. Otherwise, it is also possible to download a pre-written rule, edit and use the same. Not only that, it is possible to receive a rule written by a friend, and share a rule with the friend. Herein, when storing a written rule in a device for providing a service 120 such as a cloud server, the rule will be stored in the user's account.

Furthermore, the user device 2, 100-2 determines the rule transmitted from the user device 1, 100-1 and determines the operation that it should perform. For example, when information areas for performing each operation in the rule are divided, it is possible to compare whether or not there is information corresponding to its device in each area, and determine the operation that it should perform. Furthermore, after the determining point, the user device 2, 100-2 performs the operation that it should perform.

That is, referring to FIG. 3, the thermometer becomes aware that the operation that it should perform is to regulate the temperature to 30 degrees, and performs a temperature sensing operation. If the temperature is at or above 30 degrees, the thermometer hands over the rule to the user device 3, 100-3, for example the air conditioner, and the air conditioner determines from the received rule that "turn on the air conditioner" is the operation that it should perform, and turns on the air conditioner. Then, when a last operation is determined, the user device 3 may delete the corresponding rule. In other words, when performing a last priority operation in the received rule, the user device 3 performs an operation that it should perform, notifies the user device 1, 100-1 that an operation has been completed, and discards the corresponding rule. Accordingly, through the user device 1, 100-1, the user may recognize that rule processing has been completed.

Referring to FIG. 2, a user device such as a mobile phone and computer may execute a rule writing tool stored inside at the user's request and access the web page 120*b* of the device for providing a service 120 and directly participate in the rule writing process. In other words, the user device such as a mobile phone and computer may access the device for providing a service 120 and receive a web page 120*b*, and may set an operation regarding its device on the web page 120*b*. Furthermore, user devices capable of displaying an image may set operations for other devices such as a washing machine and audio devices. Herein, operations inside a rule may be divided into operations corresponding to a trigger and operations corresponding to an action. More specifically, if the trigger operation has an assumption format of "if~" or "when~", an action operation may have a command format. Of course, an action operation may have a format of a declarative sentence such as "I would like you to turn on~", or a questioning format of "would you turn on~?", and thus there is no limitation to the aforementioned.

However, a user device such as a mobile phone and computer sets an operation corresponding to an action on a first screen on the web page 120*b*, and when the setting is completed, sets an operation corresponding to a trigger in a second screen. Of course, it is possible to further set a rule activation trigger on a third screen. The second screen may be automatically displayed when the setting regarding the operation on the first screen is completed, but the third screen may be displayed by selecting a certain icon or button on the second screen. Herein, the first to third screens are independent from one another. However, an embodiment of the present disclosure may not only configure each screen independently but instead display one screen divided into a plurality of areas, or the first and second screen may be formed as one screen while the third screen is formed as an independent screen, and thus there is no limitation thereto.

The communication network 110 may be a wireless or wired communication network. Herein, a wired network includes an internet such as a cable network or public switched telephone network (PSTN), while the wireless communication network includes a code division multiple access (CDMA), wideband CDMA (WCDMA), global system for mobile communications (GSM), evolved packet core (EPC), long term evolution (LTE), and wireless broadband (Wibro) network. Of course, the communication network 110 according to an embodiment of the present disclosure is not limited thereto, and thus may be used in a cloud computing network under for example a cloud computing environment as an access network of a next generation mobile communication system. For example, when the communication network 110 is a wired communication network, an access point inside the communication network 110 may access an exchange office of a telephone company, but in the case of the wireless communication network, it is possible to access the serving general packet radio service (GPRS) support node (SGSN) or gateway GPRS support node (GGSN) that a communication operator runs and process the data, or access various relays such as base station transmission (BTS), NodeB, and evolved NodeB (e-NodeB) and process data.

The communication network 110 may include an access point. The access point includes a small base station such as a femto or pico widely installed in buildings. Herein, differentiation between a femto and pico is made depending on up to how many user device 1, 100-1 and user device 2, 100-2 may be accessed. Of course, the access point includes a short distance communication module for performing short distance communication such as ZigBee and Wi-Fi and the like with the user device 1, 100-1 and user device 2, 100-2. The access point may use transmission control protocol/Internet protocol (TCP/IP) or real-time streaming protocol (RTSP) for wireless communication. Herein, the short distance communication may be performed in various standards such as Bluetooth, ZigBee, infrared ray (IrDA), ultra high frequency (UHF) and radio frequency (RF) such as very high frequency (VHF) and ultra wide band (UWB) and the like besides Wi-Fi. Accordingly, the access point may extract a location of a data packet, designated an optimal communication path regarding the extracted location, and transmit the data packet to the next device, for example, to the user device 1, 100-1 and user device 2, 100-2 according to the designated communication path. The access point may share numerous lines in a general network environment, and may for example include a router, repeater and relay and the like.

The device for providing a service 120 may involve in rule writing by the user. In other words, when the user executes a rule writing tool provided in his/her computer and requests rule writing, the device for providing a service 120 may provide a web page 120b for rule writing. Furthermore, when the user requests the rule written by the user to be stored, the device for providing a service 120 may store a corresponding rule and transmit an application necessary to the corresponding operation to the user device 1, 100-1 and user device 1, 100-2 for performing the operation included in the rule. Furthermore, when the rule written by the user is executed, the device for providing a service 120 transmits the rule to the user device 1, 100-1 for performing a latter priority operation in the written rule.

Furthermore, the device for providing a service 120 may provide an open application programming interface (API) to the third party device 130. In other words, the device for providing a service 120 may operate as a platform of the third party device 130. Accordingly, the device for providing a service 120 may store various formats of application that the third party device 130 provides. These applications may relate to devices compatible with the user device 1, 100-1 and user device 2, 100-2, or may be applications operating with services or contents of the related art in an interlocked manner.

Furthermore, in the case where the user writes a rule on the web page 120b, when setting an operation corresponding to an action and trigger, if a certain device is not designated, the device for providing a service 120 may analyze an operation corresponding to the action and trigger and automatically designate one of the devices registered by the user. Herein, the device for providing a service 120 may perform the setting in consideration of the user's context. For example, assuming the user wrote a rule "if the temperature is 30 degrees or above, turn on the air conditioner", if the user is at home, the air conditioner in the house should be turned on, but if the user is in a car, the air conditioner in the car must be turned on. Therefore, when automatically designating a device that performs an operation inside a rule, the device for providing a service 120 makes the designation in consideration of the user's current context, and transmits the corresponding rule to the device for performing a former priority operation. This may be named a simplified rule writing at an abstracted level oriented around a user. That is, the user may write a rule at the abstracted level centered on the user without taking into consideration of the device.

For example, the user may select "make the house warm" as an action and select "if the weather is cold" as a trigger, and generate a simple rule at the abstract level. In such a case, the device for providing a service 120 may generate a rule based on a context-aware of the user, and recommend a rule to obtain a specific operation. Herein, the context-aware is where the current situation of the user is reflected as mentioned above. For example, the context may include a case where the user is at home and a case where the user is inside a car. Additionally, through the generated abstracted rule, the device for providing a service 120 may generate a detailed rule 400 taking into consideration the rule at the abstracted level in the device through the location and environment information of the user. Otherwise, the device for providing a service 120 may suggest a detailed rule 410 where environmental information and device has been reflected for the user's selection.

The third party device 130 is a device operated by small and medium sized developments besides companies that develop hardware or software, and products are produced in accordance with the given standards requested by the device for providing a service 120. In other words, the third party device 130 may provide an application related to devices compatible with the user device 1, 100-1 and user device 2, 100-2 or an application the operate in an interlocked manner with the services and contents of the related art. That is, the third party company develops an application related to action and trigger of the device so that the developed Internet of things (IoT) devices may operate in an interlocked manner with the service, and registers the application in a trigger/action market 120a of the device for providing a service 120.

Accordingly, the user writes a rule through the action and trigger registered in the device for providing a service 120 through the rule writing tool, and registers the rule in the device for providing a service 120. The device for providing a service 120 requests for the application related to the action and trigger according to the registered rule to be installed in each user device, and for the rule to be transmitted to the user device after the installation is completed. Furthermore, the user devices may interact with the low specification IoT device through the hub and proxy function and process the rule.

Herein, the proxy function refers to a function of, when a user device has been designated as the user device for performing a rule processing operation by the user by the user but it is not possible to perform a rule processing operation due to the low specification H/W installed, a periphery user device capable of performing the rule processing operation performing communication with the communication network 110 instead, and downloading and executing the applications related to trigger and action that should be mounted on the low specification hardware, and when the trigger and action are sensed or executed using the corresponding application, transmitting the rule to a latter priority user device.

Figure 5:
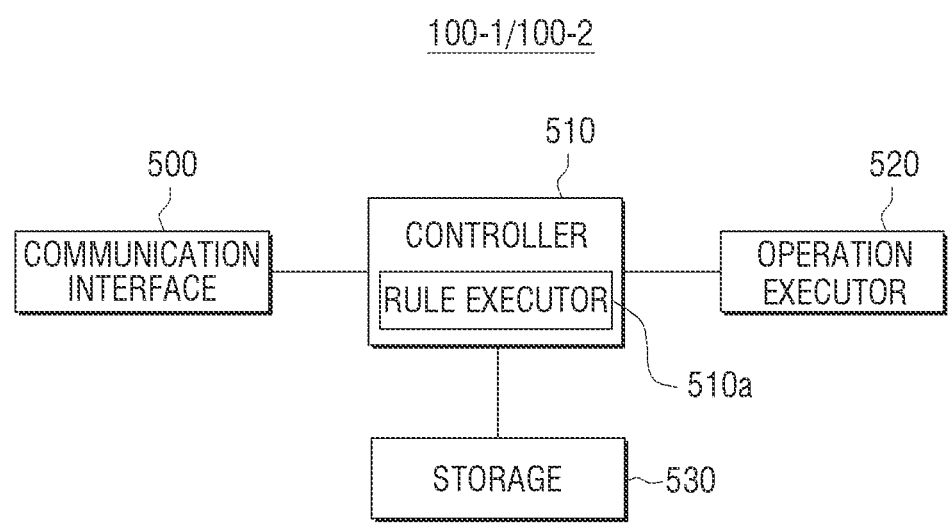
FIG. 5 is a block diagram illustrating a detailed structure of user device 1 or user device 2 of FIG. 1.

FIG. 5 is a block diagram illustrating a detailed structure of user device 1 or user device 2 of FIG. 1.

Referring to FIG. 5, the user device 1, 100-1 or user device 2, 100-2 (hereinafter referred to as user device 1) includes a part or entirety of the communication interface 500, controller 510, operation executor 520, and storage 530.

Herein, what it means by including a part or entirety of an the communication interface 500, controller 510, operation executor 520, and storage 530 means that a component such as the interface 500 may be omitted or another component such as the operation executor 520 may be integrated therein, and for easy understanding of the present disclosure, the explanation hereinafter will be made based on a case of including all the components.

The communication interface 500 may receive a rule written by the user, more specifically, rule information from the device for providing a service 120 as an external device. Herein, the device that initially receives a rule corresponds to a device that operates a former priority operation of the operations included in the rule. If the device performing a latter priority operation receives the rule, it may be deemed that former priority operation of the corresponding rule is received from a periphery device that performed the former priority operation. Of course, even if the device is not a device for performing a former priority operation, the rule may be processed in an interlocked manner with the periphery device that performs a proxy function and thus there is no limitation to the aforementioned.

The controller 510 may control the communication interface 500 and operation executor 520 inside the user device 1, 100-1, and may control the operation related to rule processing. For this purpose, the controller 510 may include a rule engine for executing a rule inside the rule executor 510a, and may further include an application for executing a detailed operation, that is an action or trigger. Accordingly, the controller 510 may determine the operation that it should perform in the received rule, and when the operation is completed, hand over the received rule back to the periphery device for performing a latter priority operation through the communication interface 500.

The operation executor 520 performs an operation that it should perform in the rule. For example, if the user device 1, 100-1 has to perform an operation of "if I arrived at home", the operation executor 520 may be a sensor. For example, the operation executor 520 may include a gyro sensor. Of course, it may be a GPS receiving module using GPS, or various functional blocks using a positioning information besides the gyro sensor, in order to determine if the user arrived at home. Such an operation executor 520 may operate according to execution of the application stored in the controller 510. For example, when a sensing value is transmitted from the operation executor 520 to the controller 510, the controller 510 may recognize that the event has been sensed through the received sensing value. Accordingly, the controller 510 may transmit the rule to the periphery device.

Of course, the operation executor 520 may be one of various components besides the sensor. For example, in the case of an air conditioner having a thermometer, a thermometer performing an operation for sensing "whether or not the temperature is or above 30 degrees" may perform the role of an operation executor 520. Furthermore, in the case of a TV, a voice recognizer for performing an operation of "when user voice is recognized", that is a microphone may be an operation executor 520. Besides the above, in the case of a refrigerator, in the case of having to perform the operation of "when 9 hours pass", a timer for sensing this may play the role of the operation executor 520.

The storage 530 may temporarily store various data being processed under the control of the controller 510, and may output the same at the request by the controller 510. Furthermore, the storage 530 may store the received rule, and provide the stored rule at the request of the controller 510. Not only that, the storage 530 may store the application related to the operation corresponding to the trigger and action inside the rule in the application, and provide the same to the controller 510.

Such a storage 530 may desirably consists of a volatile memory such as a random access memory (RAM), but the storage 530 may include a nonvolatile memory such as a read-only memory (ROM) instead.

Figure 6:
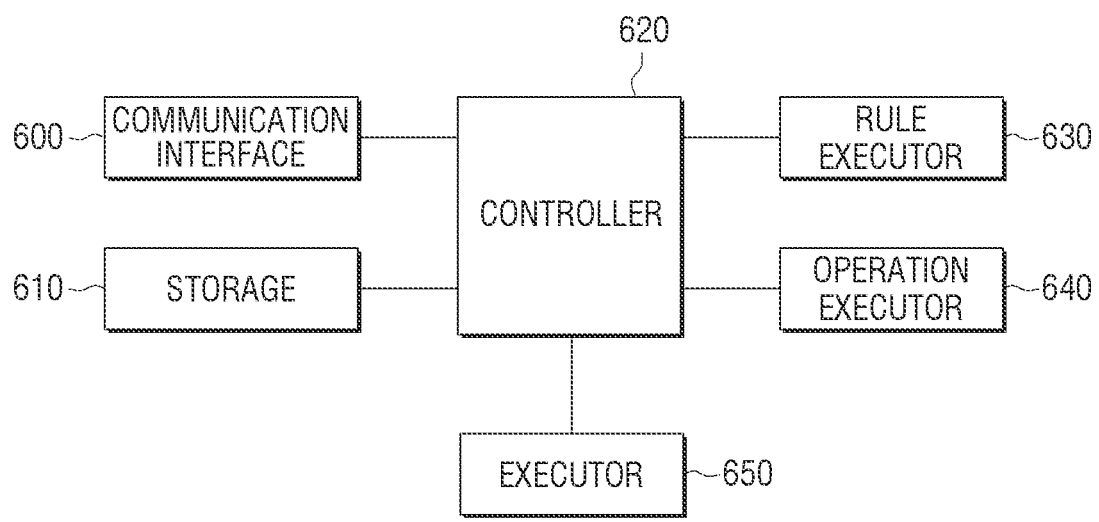
FIG. 6 is a block diagram illustrating another structure of user device 1 or user device 2 of FIG. 1.

FIG. 6 is a block diagram illustrating a structure different from user device 1 or user device 2 according to an embodiment of the present disclosure.

Referring to FIG. 6, the user device 1, 100-1 or user device 2, 100-2 (hereinafter referred to as user device 1) according to another embodiment of the present disclosure may include a part of an entirety of a communication interface 600, storage 610, controller 620, rule executor 630, operation executor 640, and display 650.

Herein, what it means by including a part or entirety means that a component such as the display 650 may be omitted or another component such as the storage 610 and rule executor 630 may be integrated in the same component and the controller 620, and for easy understanding of the present disclosure, the explanation hereinafter will be made based on a case of including all the components.

Comparing the user device 1, 100-1' and user device 2, 100-2' of FIG. 6 and user device 1, 100-1 and user device 2, 100-2' of FIG. 5, the communication interface 600 and operation executor 640 of FIG. 6 are not very much different from the communication interface 500 and operation executor 520, and thus the same applies thereto.

Furthermore, the storage 610, controller 620 and rule executor 630 of FIG. 6 may be deemed to perform the same or similar operations as the controller 510 of FIG. 5. However, if FIG. 5 illustrates a case of executing one software or executing and operating only rule processing, FIG. 6 shows that the software may be divided. In other words, the storage 610 may store the application related to the action and trigger that the device for providing a service 120 provides. Furthermore, the rule executor 630 may include a rule engine of a software (S/W) module or a hardware processor. Accordingly, when a rule is received, the controller 620 may execute the rule executor 630 and determine the operation that it should perform in the rule, and use the application stored in the storage 610 for the operations corresponding to the action or trigger. Furthermore, the operation executor 640 performs an operation corresponding to the action or trigger according to the control of the controller 620. For example, in the case of an operation of sensing the temperature, the operation executor 640 may include a temperature sensing sensor. Moreover, the operation executor 640 may further perform a specific operation of determining whether or not the temperature is or more than 30 degrees and transmit the result to the controller 620. When it is determined that the operation has been completed according to the received result, the controller may control the communication interface 600 and hand over the rule to the periphery device to perform the latter priority operations.

If the display 650 is a device that is capable of displaying an image, a demand may be made for rule writing. For example, the display 650 may display the web page 120b provided by the device for providing a service 120 of FIG. 1, and when have the user additionally set the operator when there are two or more triggers and action. In order to write a rule that is intuitive to the user, the display 650 may display a first area corresponding to the action first, and then set the operation corresponding to the action of the first area first, and then display a second area for setting the operation corresponding to the trigger. More specifically, the display may operate such that the operation corresponding to the action may be set first. For example, when setting the operation corresponding to the trigger in the second area, the display may notify the user to set the information of the first area first.

Meanwhile, according to an embodiment of the present disclosure, FIG. 6 may be configured in various ways. In other words, the storage 610 may be a volatile or nonvolatile memory, and the rule executor 630 may be a nonvolatile memory. Herein, the volatile memory may include a RAM, and the nonvolatile memory may include a ROM, erasable programmable ROM (EPROM), and electrically erasable programmable ROM (EEPROM). Furthermore, the controller 620 may include a central processing unit (CPU) and volatile memory. Accordingly, the CPU may store the application stored in the storage 610 in the volatile memory inside the controller 620 and execute the same, and further, store the rule engine-related program of the rule executor 630 in the volatile memory inside the controller 620 and then execute the same.

Figure 7:
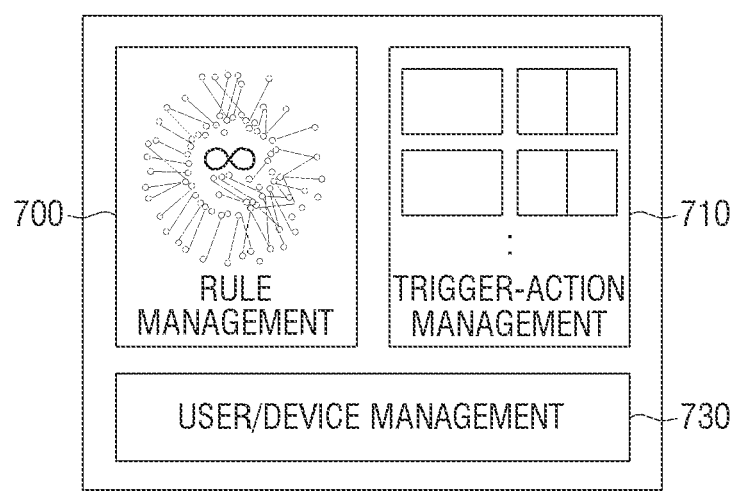
FIG. 7 is a block diagram illustrating a structure of a device for providing a service of FIG. 1.

FIG. 7 is a block diagram illustrating a structure of a device for providing a service of FIG. 1.

Referring to FIG. 7, the device for providing a service 120 according to an embodiment of the present disclosure includes a part or entirety of the program manager 700, operation manager 710 and device manager 730, and the meaning of a part or entirety is the same as aforementioned.

The program manager 700 may perform a role of providing a web page 120b for rule writing related to performing an operation of the device to the user. Furthermore, when the user requests for a storage command or execution command regarding the rule, the program manager 700 may notify the operation manager 710.

Furthermore, the operation manager 710 may perform the overall control operations of the device for providing a service 120. For example, the operation manager 710 may store and manage the application that the third party device 130 of FIG. 1 provides, and according to the storage command and execution command of the program manager 700, the operation manager 710 may control the device manager 730 to provide the application to the user device 1, 100-1 and user device 2, 100-2 of FIG. 1, and transmit the rule that the user wrote to the user device 1, 100-1.

Not only that, when the user did not designate the device for performing an operation in the rule, the operation manager 710 may determine the operation inside the rule and automatically designate at least one of the devices that the user registered. This relates to a simple rule writing at an abstracted level oriented around a user, but was sufficiently explained hereinabove, and thus further explanation is omitted.

Furthermore, the device manager 730 is for example a type of communication interface that is configured to transmit a rule to a device or to an automatically designated device in order to perform a former priority operation within the rule according to a control of the operation manager 710, and to transmit an application related to the operations corresponding to the action and trigger.

Figure 8:
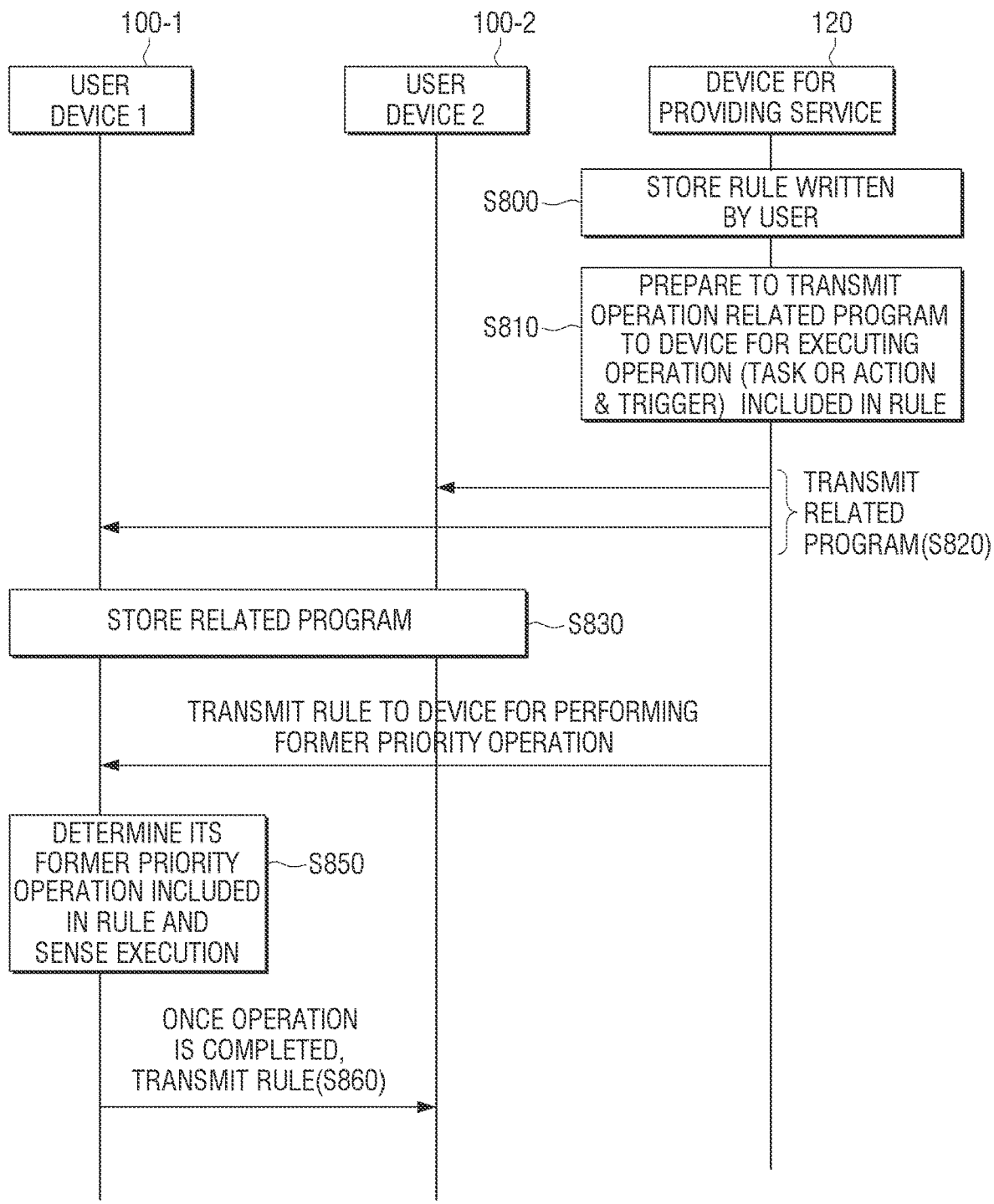
FIG. 8 is a view illustrating a service process using an ecosystem according to an embodiment of the present disclosure.

FIG. 8 is a view illustrating a service process using an ecosystem according to an embodiment of the present disclosure.

Referring to FIG. 8, the device for providing a service 120 according to an embodiment of the present disclosure may store may store a rule written by the user at operation S800. Furthermore, at a storing command from the user, the device may transmit an operation included in the rule, that is an operation corresponding to the action and trigger to a device for executing each operation, for example an application at operations S810 and S820. For example, when a rule is stored, the device for providing a service 120 may analyze the stored rule, and determine which application corresponds to the action and trigger, and which the device for performing a corresponding operation is.

When the device for providing a service 120 transmits a program related to an operation, the user device 1, 100-1 and user device 2, 100-2 stores the received program at operation S830.

Then, when there is an execution command regarding the rule written in the device for providing a service 120, the device for providing a service 120 transmits a rule to the user device 1, 100-1 that performs a former priority operation within the rule at operation S840.

Then, the user device 1, 100-1 executes the rule engine inside to analyze the rule, and determines the operation that it should perform, and then senses whether or not an event regarding the operation is being generated and has been completed at operation S850.

When, an operation is completed, the user device 1, 100-1 hands over the corresponding rule to the user device 2, 100-2 for performing a latter priority operation at operation S860. In this process, the user device 1, 100-1 may add information to the corresponding rule and transmit the same. When such information is added to the corresponding rule, the rule may be an updated rule.

Figure 9A:
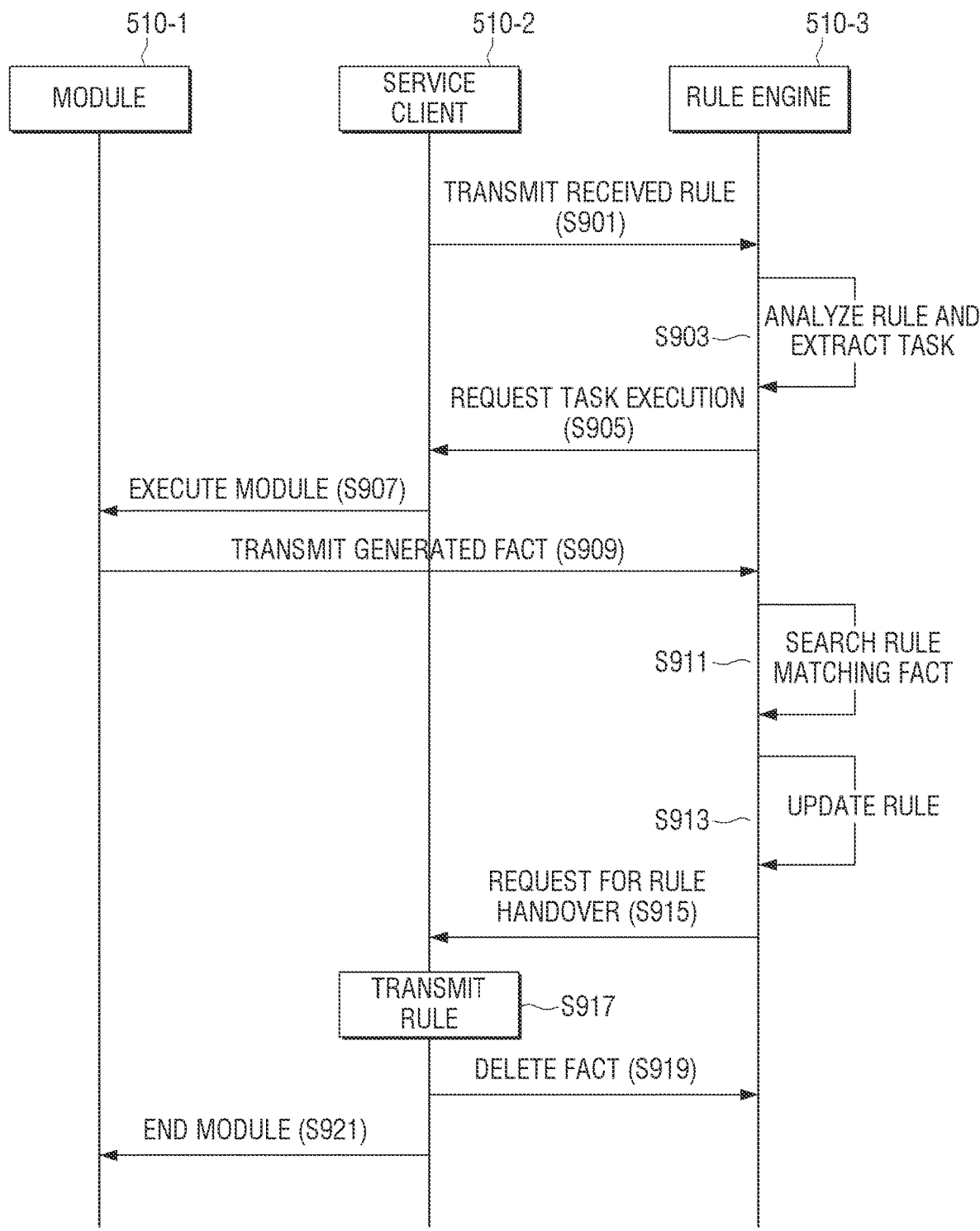
FIG. 9A is a view illustrating an internal operation of user device 1 or user device 2 of FIG. 5.

FIG. 9A is a view illustrating an internal operation of the user device 1 or user device 2 having the structure of FIG. 5.

Referring to FIGS. 9A and 5, the controller 510 of the user device 1, 100-1 according to the embodiment of the present disclosure may include an application for executing an operation corresponding to the trigger or action, that is a module 510-1, service client 510-2 that is a part of the program for rule execution, a service client 510-2 that is part of the program for rule execution, and a service client 510-2 and rule engine 510-3 that is part of the program for rule execution.

Herein, the service client 510-2 may perform a role of an interface for processing the module 510-1 and event information, and the rule engine 510-3 may perform a role of performing a core operation related to rule analysis.

The service client 510-2 transmits the rule provided from the communication interface 500 of FIG. 5 to the rule engine 510-3, at operation S901.

Then, the rule engine 510-3 analyzes the received rule, and extracts its operation, that is a task at operation S903.

Then, the rule engine 510-3 requests the service client 510-2 for an operation, that is, execution of the task in order to execute the extracted operation S905.

The service client 510-2 executes the module related to performing the corresponding operation S907.

Then, when its operation is being executed, the corresponding module 510-1 notifies the service client 510-2, and the service client 510-2 transmits the generated fact to the rule engine 510-3 at operation S909.

For example, in an operation in the operation corresponding to the trigger "when a movement is sensed", if the module 510-1 sensed the movement through a signal that the sensor provides within the operation executor 520 of FIG. 2, the sensed information is provided to the service client 510-2, and the service client 510-2 re-processes the corresponding information and transmits the same to the rule engine 510-3. Herein, the information indicating that a movement has been sensed becomes an event, and the reprocessed information becomes a fact. For example, the fact may be information where additional information such as time and the like has been inserted. For example, in the case of sensing whether or not the terminal such as a smart phone "wavered", the service client 510-2 may transmit information that a wavering occurred, the time and place that the wavering occurred, and further, how much the terminal wavered to the rule engine 510-3 as a fact. Otherwise, in the case of the terminal "determining whether or not a text message arrived", the fact may include information that the text arrived, information on from whom the text came from, and information on the place and time of the text.

Of course, such a fact may be transmitted from a periphery device. For example, in a case where as a result of determining the currently received rule, the user device for example when the air conditioner has to measure the surrounding temperature but there is no sensor for sensing the temperature, or a sensor is broken, it may be possible to receive a temperature sensing value as a fact from the periphery device. This may be performed at a request by the user device, but it may also be performed by the periphery device directly receiving the rule and determining the operation corresponding to the trigger corresponding to the trigger of the user device. As such, the processing of the fact may be made in various ways, and thus there is no limitation thereto.

Next, the rule engine 510-3 searches a rule that matches the received fact and updates the searched rule at operations S911 and S913. For example, operations S911 to S913 may be necessary to process a plurality of rules, but to process one rule, operation S911 may be omitted.

Furthermore, the rule engine 510-3 requests the service client 510-2 to transmit the rule to the device for performing a latter priority operation S915.

Accordingly, the service client 510-2 may transmit the rule to the device for performing a latter priority operation through the communication interface 500 at operation S917.

Then, the service client 510-2 will request the rule engine 510-3 to delete the corresponding fact, and demand the module 510-1 to end the process at operations S919 and S921.

Figure 9B:
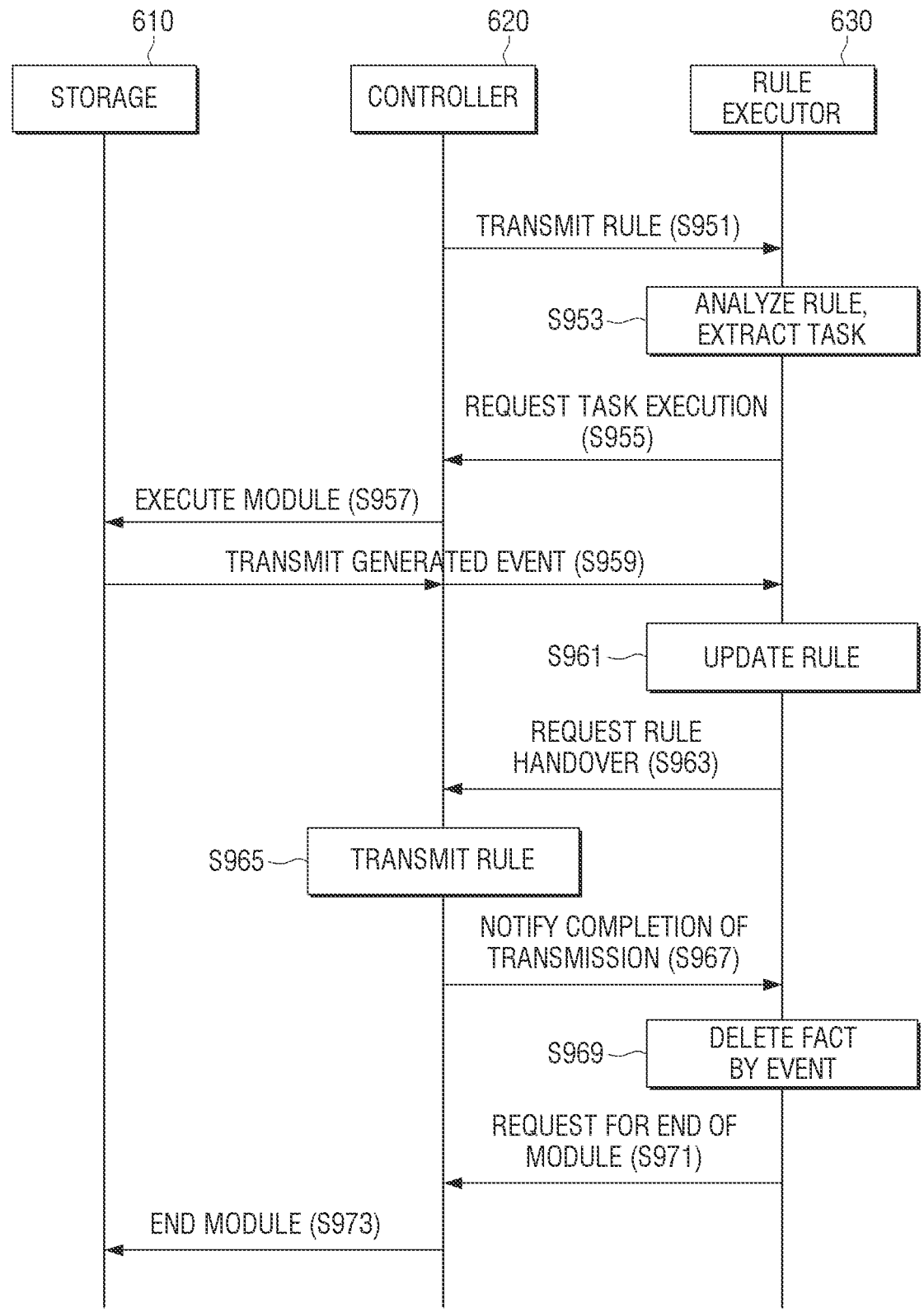
FIG. 9B is a view illustrating an internal operation of user device 1 or user device 2 of FIG. 6.

FIG. 9B is a view illustrating an internal operation of the user device 1 or user device 2 according to an embodiment of the present disclosure.

Referring to FIGS. 9B and 6, the controller 620 of the user device 1, 100-1 according to an embodiment of the present disclosure may transmit the received rule to the rule executor 730 at operation S951.

The rule executor 630 may execute the rule engine and analyze the rule to determine (or extract) an operation (task) S953. Furthermore, the rule executor 630 requests the controller 620 to execute the operation at operation S955.

In this process, the controller 620 executes the application, that is the module stored in the storage 610 and operates the operation executor 640 such as the sensor at operation S957. For example, assuming the operation executor 640 is the sensor, the controller 620 may use the application stored in the storage 610 to operate the sensor.

Furthermore, the application inside the storage 610 determines whether or not a sensing signal is sensed through the sensor of the sensor unit, and when the sensing signal is sensed, the storage 610 determines that the event occurred, and notifies the controller 620, and the controller 620 may transmit the generated event back to the rule executor 630 at operation S959.

Furthermore, when the event is received, the rule executor 630 may insert the information notifying that the former priority operation has been completed, thereby updating the rule at operation S961.

Furthermore, it is possible to request a rule hand over while transmitting the updated rule to the controller 620 at operation S963.

At the request by the rule executor 630, the controller 620 transmits the rule to the device for performing a latter priority operation S965.

Furthermore, when the rule transmission is completed, by notifying the rule executor 630 again, the controller 620 may delete the fact related to the event at operations S967 and S969.

Then, the rule executor 930 may request the controller 620 to end the module at operation S971, and end the execution on the module inside the storage 610 at operation S973.

Meanwhile, the operation of FIG. 9B may be modified in various ways. In other words, the controller 620 may store the module stored in the nonvolatile memory, that is the application and the rule execution program stored in the rule executor 630 in separate volatile memories and execute the same. In the process, the controller 620 may use the volatile memory inside thereof for quick processing of the information, and thus there is no limitation thereto.

Figure 10:
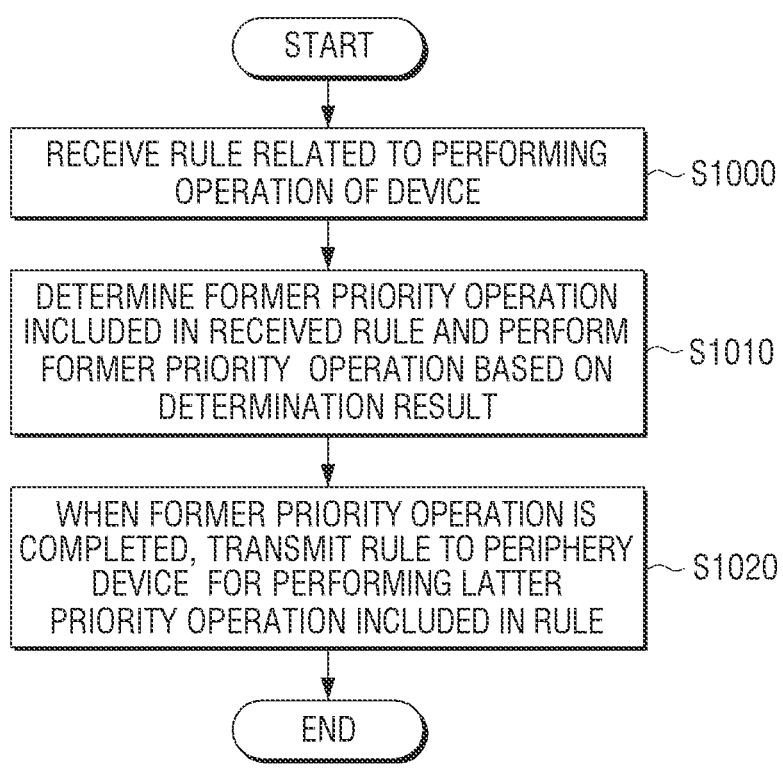
FIG. 10 is a flowchart illustrating a driving process of user device 1 or user device 2 illustrated in FIG. 1.

FIG. 10 is a flowchart illustrating a process for driving the user device 1 and user device 2 of FIG. 1.

Referring to FIGS. 10 and 1, the user device 1, 100-1 receives a rule from an external device, that is, the device for providing a service 120 in order to execute the former priority operation included in the rule written by the user at operation S1000.

Furthermore, the user device 1, 100-1 determines the former priority operation included in the received rule, and performs the former priority operation based on the determined result at operation S1010. In other words, the user device 1, 100-1 may determine the former priority operation that it should perform in the received rule, and sense whether or not the determined former priority operation has been completed. For example, in order to perform the former priority operation corresponding to the trigger "when arrives at home", the user device 1, 100-1 such as the mobile phone may sense whether or not the user arrived at home through the gyro sensor.

When the former priority operation is completed, the corresponding rule is transmitted to the periphery device for performing the latter priority operation included in the rule at operation S1020. For example, the mobile phone may transmit the rule to the door lock so as to perform a latter priority operation corresponding to executing "release door lock".

Thereafter, the door lock may sense whether or not the door lock is released, and if there is a subsequent operation of "turn on the living room light" when the door lock is being released, the door lock may transmit the rule to the lighting device of the living room.

Figure 11:
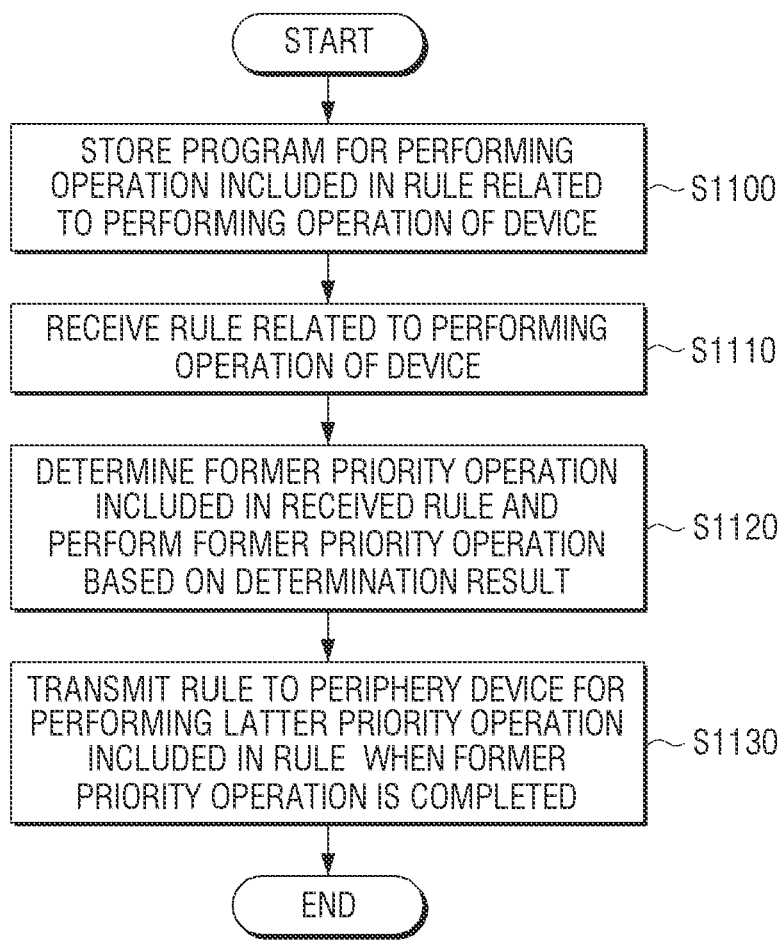
FIG. 11 is a flowchart illustrating another driving process of user device 1 or user device 2 illustrated in FIG. 1.

FIG. 11 is a flowchart illustrating another driving process of the user device 1 or user device 2 illustrated in FIG. 1 according to an embodiment of the present disclosure.

Referring to FIGS. 11 and 1 for the sake of easy explanation, the user device 1, 100-1 stores a program for performing an operation included in the rule written by the user at operation S1100. Such a storing operation may be made when there is a storing command of the rule.

Then, at the request for executing the written rule, the device for performing the former priority operation in the rule, that is the user device 1, 100-1 receives the corresponding rule from the device for providing a service at operation S1110.

Furthermore, the user device 1, 100-1 determines the former priority operation included in the received rule, and performs the former priority operation based on the determination result at operation S1120. More specifically, the user device 1, 100-1 determines the former priority operation that it should perform in the received rule. Furthermore, the user device 1, 100-1 senses whether or not the determined operation has been performed and completed.

When the former priority operation is completed, the rule is transmitted to the periphery device for executing the latter priority operation at operation S1130. Herein, the rule may be provided in the format of a rule where information has been added and updated.

Figure 12:
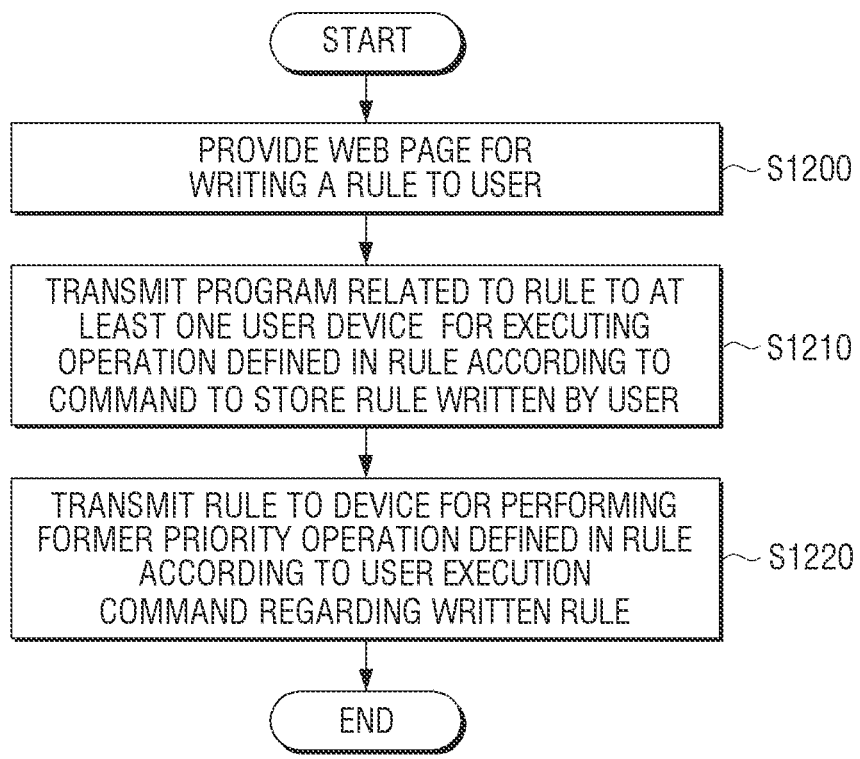
FIG. 12 is a flowchart illustrating a driving process of a device for providing a service of FIG. 1.

FIG. 12 is a flowchart illustrating a driving process of a device for providing a service of FIG. 1.

Referring to FIGS. 12 and 1 together for the sake of easy explanation, the device for providing a service 120 according to an embodiment of the present disclosure provides a web page for rule writing to the user at operation S1200.

Then, the device for providing a service 120 transmits a rule related program to at least one user device for executing an operation defined in the rule at a storing command of the rule written by the user at operation S1210. Herein, the rule related program refers to a program related to the action and trigger that configures the operation.

Furthermore, the device for providing a service 120 transmits a rule to the device for performing the former priority operation defined in the rule at the user's execution command regarding the written rule at operation S1220. Referring to FIG. 1, the device for performing the former priority operation becomes the user device 1, 100-1.

Figure 13:
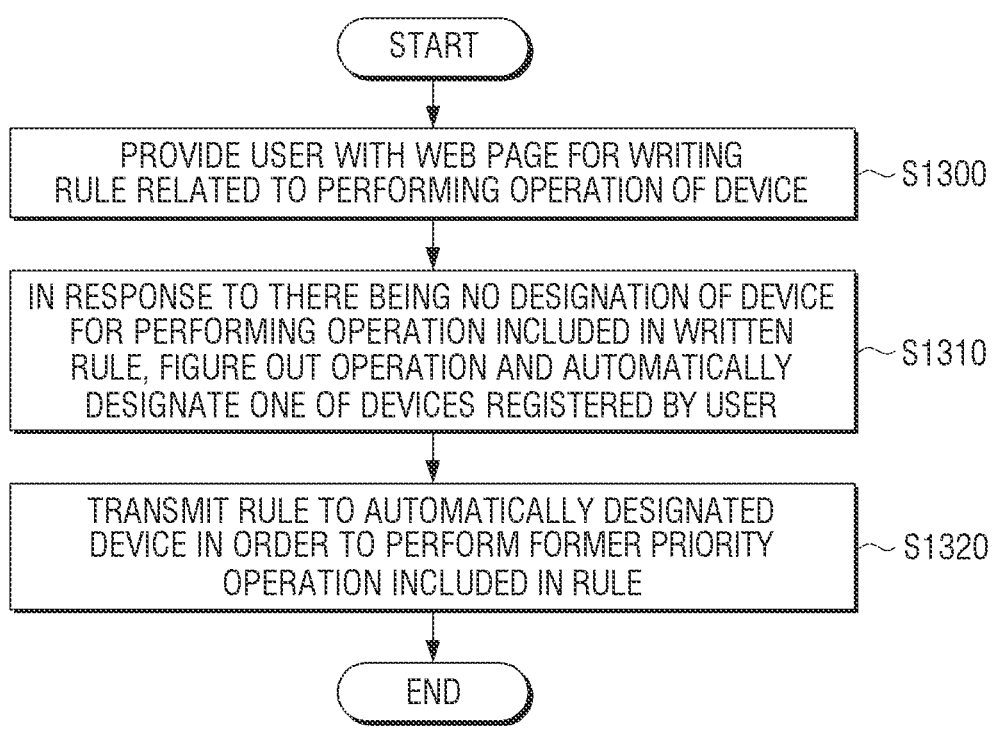
FIG. 13 is a flowchart illustrating another driving process of an apparatus for providing a service of FIG. 1.

FIG. 13 is a flowchart illustrating another driving process of the device for providing a service of FIG. 1. FIG. 13 is related to a simple rule writing at an abstracted level oriented around a user.

Referring to FIGS. 13 and 1 together for the sake of easy explanation, the device for providing a service 120 according to an embodiment of the present disclosure provides a web page for rule writing to the user at operation S1300.

Then, when there is no designation of a device for performing an operation included in the written rule, the device for providing a service 120 figures out the operation inside the rule and automatically designates at least one of the devices registered by the user at operation S1310. In this process, the device for providing a service 120 may recognize the user situation and designate the device. This was sufficiently explained hereinabove, and thus further explanation is omitted.

Furthermore, the device for providing a service 120 transmits a rule to the automatically designated device for performing the former priority operation S1320.

Figure 14A:
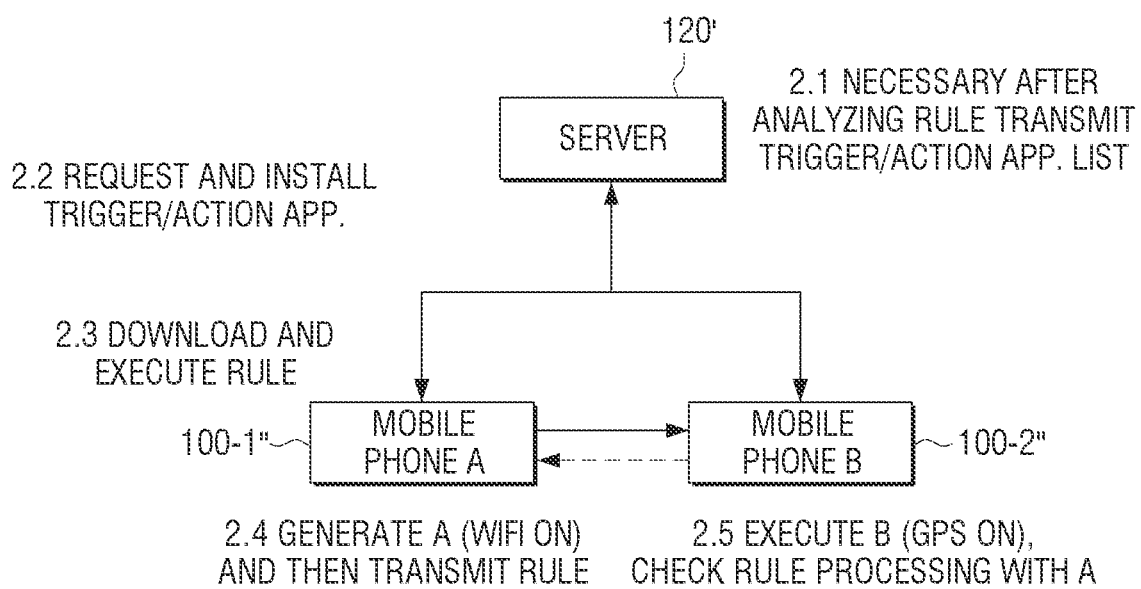
FIGS. 14A, 14B, 14C, and 14D are views for explaining a rule processing procedure using an operator when there are two or more triggers according to various embodiments of the present disclosure.
Figure 14B:
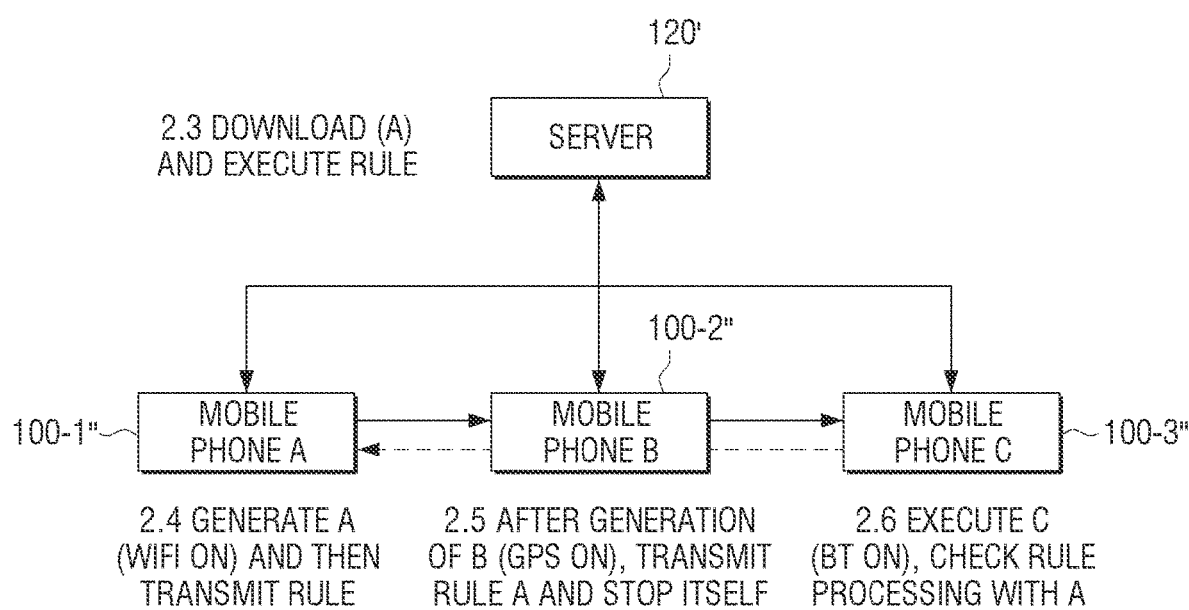
Figure 14C:
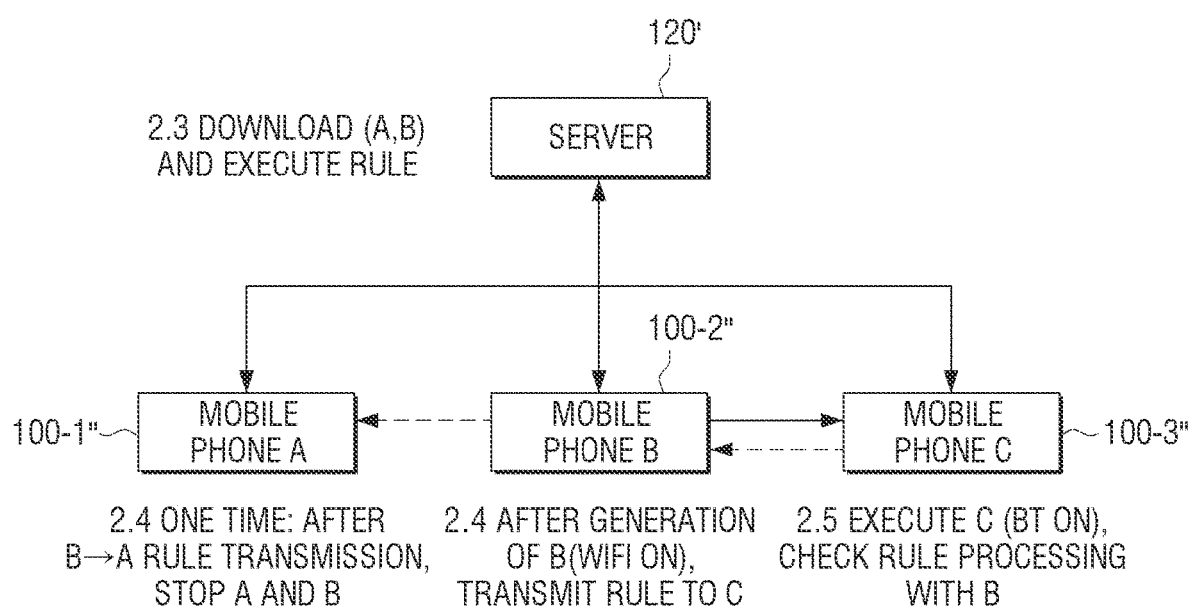
Figure 14D:
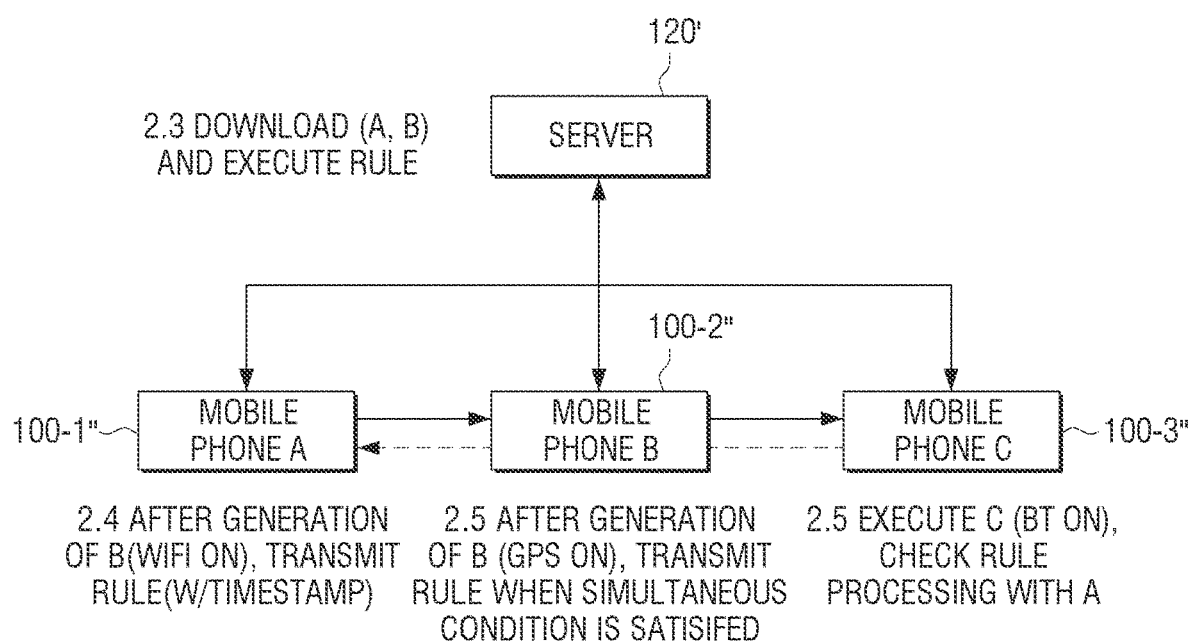

FIGS. 14A to 14D are views for explaining a rule writing process using an operator when there are two or more triggers according to various embodiments of the present disclosure, FIG. 14A illustrating a rule process through the operation of A→B, FIG. 14B through A&B→C, FIG. 14C through A |B→C, and FIG. 14D through A*B→C. Herein, '&'(AND) indicates a consecutive rule (ex. If A and B, do C), '|'(OR) indicates a rule (ex. If A or B, do C), and '*'(Simultaneous) indicates a simultaneous rule (ex. If A and B, do C).

Hereinafter, explanation will be made based on the assumption that the user device 1, 100-1 and user device 2, 100-2 of FIG. 1 are mobile phones, and the device for providing a service 120 is a server.

Referring to FIG. 14A, the server 120' may analyze the rule written by the user and transmit the necessary execution and trigger application list to the mobile phone A 100-1" and mobile phone B 100-2" (see 2.1).

Furthermore, mobile phone A 100-1" and mobile phone B 100-2" request an application related to the action and trigger and install the same (see 2.2).

The server 120' transmits the rule to the mobile phone A 100-1" that performs the former priority operation. Mobile phone A 100-1" receives the rule and executes the operation it should perform (see 2.3).

For example, if the operation (task) that it should perform is to sense whether or not Wi-Fi (or Wi-Fi module) is turned on, the mobile phone A 100-1", when it is sensed that Wi-Fi is turned on, the rule is transmitted to the mobile phone B 100-2".

Then, the mobile phone B 100-2" turns on the GPS module for location tracking for example as the former priority (or latter priority) operation, and transmits the rule in charge of the former priority operation of the rule to the mobile phone A 100-1". In other words, the mobile phone B 100-2" notifies that the rule processing has been made normally.

Furthermore, as in FIG. 14B, the mobile phone A 100-1" and mobile phone B 100-2" perform consecutive operations according to AND trigger (see 2.3~2.5), and the mobile phone C 100-3" executes the Bluetooth module, and transmits the rule to A, notifying that the rule has been processed normally.

Furthermore, as in FIG. 14C, the mobile phone A 100-1" and mobile phone B 100-2" having an OR operator may receive the rule from the server 120' at the same time (see 2.3).

Furthermore, if the mobile phone B 100-2" satisfies the trigger, that is when it is sensed whether or not Wi-Fi has been executed, since the rule has the OR operator, the mobile phone A 100-1" transmits the rule to the mobile phone C 100-3" that performs the operation corresponding to the action. The mobile phone C 100-3" turns on the Bluetooth and transmits the rule to the mobile phone B 100-2", and notifies that the rule processing has been made normally. Herein, if the rule is a one time rule, the rule is performed once and then deleted.

Referring to FIG. 14D, since the rule is a rule having the operator (simultaneous) '*', the mobile phone A 100-1" and mobile phone B 100-2" receive a rule from the server 120' simultaneously (see 2.3). The mobile phone A 100-1" senses whether or not Wi-Fi is being turned on, and the mobile phone B 100-2" senses whether or not the GPS is being turned on. When each operation is sensed in the mobile phone A 100-1" and mobile phone B 100-2", the sensed time is recorded in the rule, and the mobile phone A 100-1" transmits the rule to mobile phone B 100-2" and mobile phone B 100-2" transmits the rule to mobile phone A 100-1". The mobile phone A 100-1" and mobile phone B 100-2" compare the time when its operation occurred with the time when the operation of another mobile phone occurred recorded in the rule, and if it is determined that the two occurred at the same time, transmits the rule to the mobile phone C 100-3".

Meanwhile, FIGS. 14B to 14D may include operations of 2.1 and 2.2 of FIG. 14A.

Figure 15:
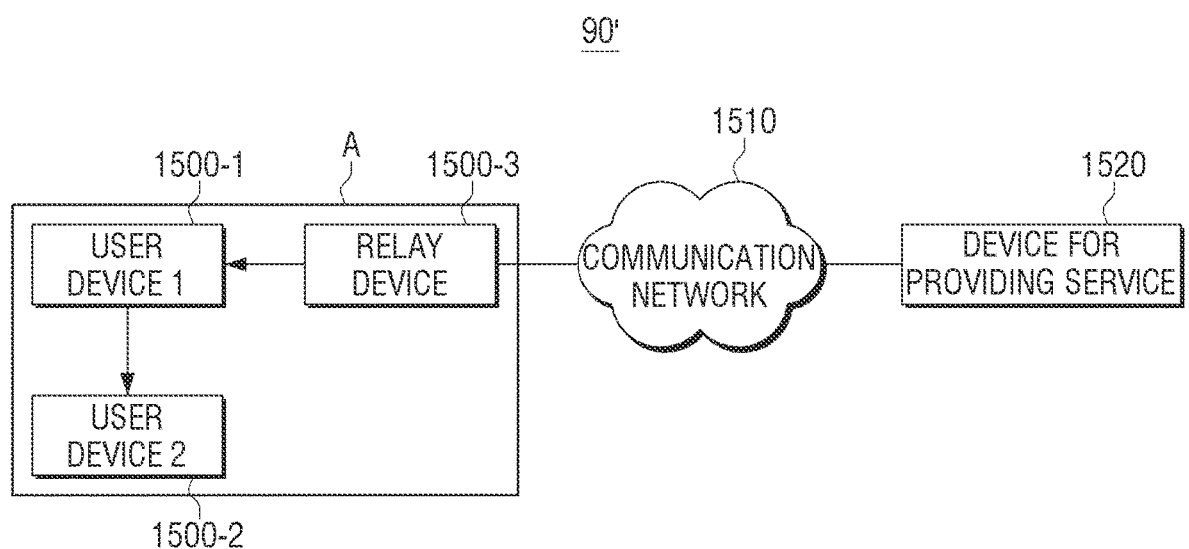
FIG. 15 is a view illustrating an ecosystem according to an embodiment of the present disclosure.

FIG. 15 is a view illustrating an ecosystem according to an embodiment of the present disclosure.

Referring to FIG. 15, the ecosystem 90' according to an embodiment of the present disclosure may include the user device 1, 1500-1, user device 2, 1500-2, relay device 1500-3, communication network 1510, and device for providing a service 1520.

Comparing with FIG. 1, there is a difference that the ecosystem 90' of FIG. 15 provides a relay device 1500-3 such as a home server or home gateway, thereby reducing the load of the device for providing a service 1520 such as the cloud server.

For example, the relay device 1500-3 is for example a home server, and the device for providing a service 1520 manages the event occurring in the home A, thereby reducing the load of the device for providing a service 1520.

The device for providing a service 1520 is for example a cloud server having an account for each user, and stores and manages information on all devices that the user has such as the home A, and may manage the rule information currently being executed.

Other user device 1, 1500-1, user device 2, 1500-2, communication network 1510, and device for providing a service 1520 were fully explained hereinabove and thus further explanation is omitted.

Figure 16:
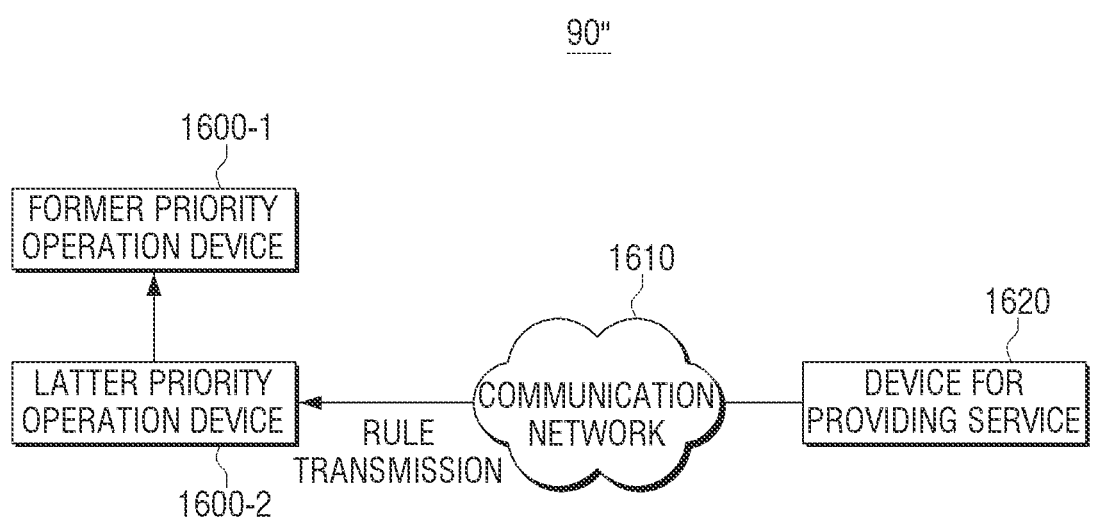
FIG. 16 is a view illustrating an ecosystem according to an embodiment of the present disclosure.

FIG. 16 is a view illustrating the ecosystem according to an embodiment of the present disclosure.

Referring to FIG. 16, the ecosystem 90" according to an embodiment of the present disclosure may include a former priority operating device 1600-1, latter priority operating device 1600-2, communication network 1610 and device for providing a service 1620.

Comparing with FIG. 1, the former priority operating device 1600-1 of FIG. 16 is a case where it has to perform a former priority operation according to the rule writing of the user, but the specification for hardware module or program for receiving the rule directly through the communication network 1610 is insufficient. For example, when having a communication module for Bluetooth communication only, the rule cannot be directly received from the communication network 1610 that performs CDMA communication or Wi-Fi communication.

In this case, if there is a latter priority operating device 1600-2 capable of communicating with the communication network 1610, the former priority operating device 1600-1 may receive the rule from the surrounding latter priority operating device 1600-2.

Then, the former priority operating device 1600-1 may process the rule and transmit it back to the latter priority operating device 1600-2. In this process, if the latter priority operating device 1600-2 is capable of performing an operation with the former priority operating device 1600-1 at the same time, the latter priority operating device 1600-2 may transmit the rule to the former priority operating device 1600-1, and then perform its operation as well. Simultaneous operation was explained hereinabove with reference to FIG. 14D.

In the case of the user writing a rule and designating the device to perform an operation corresponding to a certain operation that is operation or action, the device for providing a service 1620 may check information related to the specification of each device based on the information of device stored inside.

As a result, if it is determined that the former priority operating device 1600-1 cannot receive a rule through the communication network 1610, it is possible to check the specification of the latter priority operating device 1600-2 and if receiving the rule is possible, it is possible to request the communication network 1610 to transmit the rule to the latter priority operating device 1600-2, and the latter priority operating device 1600-2 may determine whether or not to transmit the rule to the former priority operating device 1600-1 and transmit the rule.

For example, if there is no information on completion of the former priority operation as a result of checking the transmitted rule, the latter priority operating device 1600-2 may transmit the rule to the former priority operating device 1600-1 based thereon. Otherwise, in the case of providing additional information of transmitting the rule to the former priority operating device 1600-1 in the device for providing a service 1620, the rule may be transmitted based thereon. Furthermore, if the latter priority operating device 1600-2 determined that it has a latter priority in the rule, but received the rule from the communication network 1610 and not from the periphery device such as the former priority operating device 1600-1, the rule may be transmitted to the former priority operating device 1600-1. In such a way, the former priority operating device 1600-1 according to the embodiment of the present disclosure may receive the rule from the periphery device and perform the former priority operation.

Other former priority operating device 1600-1 and latter priority operating device 1600-2, communication network 1610 and device for providing a service 1620 are not much different from the user device 100-1, 100-2, communication network 110, and device for providing a service 120 of FIG. 1, and thus further explanation is omitted.

Meanwhile, even though all the components configuring the embodiment of the present disclosure are explained to be combined in one or operate in one, there is no limitation thereto. That is, as long as they are within the purpose of the present disclosure, all the components may be selectively combined as one or more components and operate accordingly. Furthermore, even though all the components are embodied as one independent hardware, a part or entirety of the components may be selectively combined and be embodied as a computer program having a program module performing a part of an entirety of functions combined in one or a plurality of hardware. The codes and code segments for configuring the computer program may be easily conceived by those skilled in the art. Such a computer program may be stored in a non-transitory computer readable media and be executed, thereby realizing the embodiments of the present disclosure.

Herein, a non-transitory computer readable media refers to a computer readable media that stores data semi-permanently and not for a short period of time such as a register, cache and memory. Specifically, the aforementioned programs may be stored in a non-transitory computer readable media such as a compact disc (CD), digital versatile disc (DVD), hard disk, Blue-ray disc, universal serial bus (USB), memory card, and ROM and provided therein.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A user device comprising:
communication interface;
a memory; and
a processor configured to control to:
receive, from a service providing device through the communication interface, a rule including information on a priority order operation and information on a next order operation,
determine an operation for the priority order operation based on the rule,
perform the priority order operation based on a determination result of the information on the priority order operation included in the received rule, and
in response to the priority order operation being completed, transmit the rule to a periphery device for performing the next order operation included,
wherein the priority order operation is an operation performed by the user device based on the determination result of the user device, and
wherein the next order operation is determined by the periphery device, based on the transmitted rule, and performed by the periphery device after the performing of the priority order operation by the processor is completed.

2. The user device according to claim 1, wherein the memory is further configured to receive the rule from the user device for providing a service that received input of an executing command regarding the rule or from another user device that performed an operation prior to the priority order operation, and stores the rule.

3. The user device according to claim 1,
wherein the memory further comprises a program for executing the priority order operation, and
wherein the processor is further configured to execute stored programs related to the performance of the priority order operation.

4. The user device according to claim 3, wherein the processor, in response to a memory command regarding the rule, is further configured to:
receive the program from the user device for providing a service through a communication interface, and
store the received program.

5. The user device according to claim 1, wherein the processor is further configured to transmit additional information used for performing the next order operation when transmitting the rule to the periphery device.

6. The user device according to claim 1,
wherein the priority order operation comprises an operation for determining whether a predetermined trigger is satisfied,
wherein the next order operation comprises a control operation to execute in response to the predetermined trigger being satisfied, and
wherein an operation executor comprises at least one sensor for sensing whether or not the predetermined trigger is satisfied.

7. A method of driving a user device, the method comprising:
receiving, from a service providing device through a communicator, a rule including information on a priority order operation and information on a next order operation;
determining an operation for the priority order operation based on the rule;
controlling to perform the priority order operation based on a determination result of the information on the priority order operation included in the received rule; and
controlling to, in response to the priority order operation being completed, transmit the rule to a periphery device for performing the next order operation included in the rule,
wherein the priority order operation is an operation performed by the user device based on the determination result of the user device, and
wherein the next order operation is determined by the periphery device, based on the transmitted rule, and performed by the periphery device after the performing of the priority order operation is completed.

8. The method according to claim 7,
wherein the storing comprises receiving the rule from the user device for providing a service that received input of an executing command regarding the rule or from another user device that performed an operation prior to the priority order operation, and storing the rule.

9. The method according to claim 7,
wherein the storing comprises storing a program for executing the priority order operation, and
wherein the storing further comprises executing stored programs related to the performance of the priority order operation.

10. The method according to claim 9, wherein the storing comprises, in response to a storage command regarding the rule:
receiving the program from the user device for providing a service through a communication interface, and
storing the received program.

11. The method according to claim 7, wherein the controlling to transmit the rule to the periphery device comprises providing additional information used for performing the next order operation when transmitting the rule to the periphery device.

12. The method according to claim 7,
wherein the priority order operation comprises an operation of determining whether a predetermined trigger is satisfied,
wherein the next order operation comprises a control operation to execute in response to the predetermined trigger being satisfied, and
wherein the performing the priority order operation comprises sensing whether the predetermined trigger is satisfied.

13. A device for providing a service, the device comprising:
a communicator;
a memory configured to store at least one of software module; and
a processor configured to connect to the memory to control the device,
wherein the processor further configured to:
provide a web page to a user for writing a rule related to performing an operation of the device,
in response to there being no designation of the device for performing an operation included in the written rule, determine the operation and automatically designate one of registration devices of the user, and
control the communicator to transmit the rule to the designated device in order to perform a priority order operation included in the rule, wherein the processor is further configured to recognize a context of the user and automatically designate the device, and wherein the priority order operation is determined by the designated device, based on the transmitted rule, and performed by the designated device after the performing of the priority order operation by the processor is completed.

14. The device according to claim 13, wherein the processor is further configured to control a device manager to transmit a program related to the operation to at least one user device for executing the operation defined in the rule.

15. The device according to claim 13, wherein the processor, in response to a command to execute the written rule from the user, is further configured to control a device manager to transmit the rule to a user device for performing a priority order operation defined in the rule.

16. A method of driving a device for providing a service, the method comprising:

providing a web page to a user for writing a rule related to performing an operation of the device;

in response to there being no designation of the device for performing an operation included in the written rule, determining the operation and automatically designating one of registering devices of a user; and transmitting the rule to the automatically designated device in order to perform a priority order operation included in the rule, wherein the automatically designating comprises recognizing a context of the user and automatically designating the device, and wherein the priority order operation is determined by the designated device, based on the transmitted rule, and performed by the designated device after the performing of the priority order operation is completed.

17. The method according to claim 16, further comprising, in response to a command to store the written rule, transmitting a program related to the operation to at least one user device for executing an operation defined in the rule.

18. The method according to claim 16, further comprising, in response to a command to execute the written rule from the user, transmitting the rule to a user device for performing a priority order operation defined in the rule.

* * * * *